US009915753B2

(12) United States Patent
Hiles et al.

(10) Patent No.: US 9,915,753 B2
(45) Date of Patent: Mar. 13, 2018

(54) ELECTRICALLY OPERATED RADIATION SOURCE OPERATING POWER, RELIABILITY AND LIFE MANAGEMENT SYSTEMS AND METHODS

(71) Applicant: Schlumberger Technology Corporation, Sugar Land, TX (US)

(72) Inventors: Kevin Lee Hiles, Pittstown, NJ (US); Luke T. Perkins, Plainsboro, NJ (US); Robert A. Adolph, Pennington, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 79 days.

(21) Appl. No.: 15/105,321

(22) PCT Filed: Dec. 19, 2014

(86) PCT No.: PCT/US2014/071520
§ 371 (c)(1),
(2) Date: Jun. 16, 2016

(87) PCT Pub. No.: WO2015/095714
PCT Pub. Date: Jun. 25, 2015

(65) Prior Publication Data
US 2016/0320520 A1 Nov. 3, 2016

Related U.S. Application Data

(60) Provisional application No. 61/918,399, filed on Dec. 19, 2013.

(51) Int. Cl.
*G01V 5/00* (2006.01)
*G01V 5/10* (2006.01)
(Continued)

(52) U.S. Cl.
CPC ............ *G01V 5/10* (2013.01); *E21B 47/1015* (2013.01); *E21B 47/18* (2013.01); *E21B 49/00* (2013.01); *E21B 49/08* (2013.01); *H05H 3/06* (2013.01)

(58) Field of Classification Search
CPC ............ G01V 5/10; G01V 3/18; G01N 23/00
(Continued)

(56) References Cited

U.S. PATENT DOCUMENTS 7,073,378 B2   7/2006 Smits et al.
2009/0219028 A1  9/2009 Perkins et al.
(Continued)

FOREIGN PATENT DOCUMENTS

EP          0269620 B1    9/1991

OTHER PUBLICATIONS

Matsunami et al., "Energy Dependence of the Ion-Induced Sputtering Yields of Monoatomic Solids", Atomic and Nuclear Data Tables 31, pp. 1-80, 1984.

*Primary Examiner* — David Porta
*Assistant Examiner* — Meenakshi Sahu
(74) *Attorney, Agent, or Firm* — Michael Dae

(57) ABSTRACT

The present disclosure describes a neutron generator including an ion source that generates ions; a target that outputs neutrons when the ions impact the target; one or more power supplies that supply electrical power to the ion source and the target; and a control system. The control system determines one or more rules that describe relationships between operational parameters, useful life, reliability, neutron output, environment, and constraints of the neutron generators; determines one or more operational parameter setpoints based at least in part on the one or more rules; and instructs the one or more power supplies to adjust electrical power (Continued)

supplied to the ion source, the target, or both based at least in part on the one or more operational parameter setpoints.

20 Claims, 21 Drawing Sheets

(51) Int. Cl.
*E21B 47/10* (2012.01)
*H05H 3/06* (2006.01)
*E21B 47/18* (2012.01)
*E21B 49/00* (2006.01)
*E21B 49/08* (2006.01)

(58) Field of Classification Search
USPC .......................................................... 250/256
See application file for complete search history.

(56) References Cited

U.S. PATENT DOCUMENTS

| 2011/0044418 A1 | 2/2011 | Stubbers et al. |
| 2012/0081041 A1 | 4/2012 | Cheung et al. |
| 2013/0208841 A1 | 8/2013 | Perkins et al. |

… # ELECTRICALLY OPERATED RADIATION SOURCE OPERATING POWER, RELIABILITY AND LIFE MANAGEMENT SYSTEMS AND METHODS

CROSS-REFERENCE TO RELATED APPLICATIONS

This application claims priority to and the benefit of U.S. Provisional Application Ser. No. 61/918,399, entitled "METHOD FOR ELECTRICALLY OPERATED RADIATION SOURCE OPERATING POWER, RELIABILITY AND LIFE MANAGEMENT," filed Dec. 19, 2013, which is hereby incorporated by reference in its entirety for all purposes.

BACKGROUND

The present disclosure relates generally to electrically operated radiation sources, and more particularly, to managing operational parameters of electrically operated radiation sources.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electrically operated radiation sources, such as an x-ray generator, a gamma ray generator, or a neutron generator, may generate radiation efficiently and on-demand to facilitate measuring surrounding conditions (e.g., landmine detection, portal monitors, and the like). For example, a sealed tube neutron generator, a pulsed neutron generator (PNG) or an electronic X-ray generator may be used in a downhole tool to facilitate determining properties of the surrounding formations, such as porosity and/or mineralogy. In some embodiments, the porosity may be determined based at least in part on count rate (e.g., number of neutrons measured by a detector in the tool or gamma-rays inducted by the neutron interactions), and the mineralogy may be determined based at least in part on gamma rays energies detected by a scintillator. As such, it would be beneficial to adjust operational parameters of the electrically operated radiation source to reliably generate a desired radiation (e.g., neutron) output.

Additionally, when the electrically operated radiation source is used in a downhole tool, other objectives and constraints may also be considered. More specifically, since the electrically operated radiation source may be hundreds or thousands of feet below ground, accessibility may be limited. As such, it would beneficial to adjust operational parameters of the electrically operated radiation source to improve useful life of the electrically operated radiation source and to improve reliability of an electrical system used to supply power to the electrically operated radiation source. Furthermore, since there may be a finite amount of electrical power supplied to the downhole tool, it would be beneficial to adjust operational parameters of the electrically operated radiation source within an electrical power consumption constraint and/or a power loss constraint. However, adjustment of operational parameters may positively affect some desired objectives while negatively affecting other desired objectives.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A first embodiment describes a pulsed neutron generator including an ion source that generates ions; a target that outputs neutrons when the ions impact the target; one or more power supplies that supply electrical power to the ion source and the target; and a control system. The control system determines one or more rules that describe relationships between operational parameters, useful life, reliability, neutron output, and constraints of the pulsed neutron generators; determines one or more operational parameter setpoints based at least in part on the one or more rules; and instructs the one or more power supplies to adjust electrical power supplied to the ion source, the target, or both based at least in part on the one or more operational parameter setpoints.

A second embodiment describes a tangible, non-transitory, computer-readable medium storing instructions to be executable by a processor in a control system. The instructions include instructs to receive, using the processor, input parameters from one or more monitors in an electrically operated radiation source; determine, using the processor, an initial operational parameter setpoint by inputting a first one or more of the input parameters to a first rule, in which the first rule describes a desired value of an operational parameter of the electrically operated radiation generated based on the first one or more input parameters; determine, using the processor, an operational parameter setpoint correction by inputting a second one or more of the input parameters to a second rule, in which the second rule describes a constraint on the operational parameter based on the second one or more input parameters; determine, using the processor, a corrected operational parameter setpoint by additively applying the operational parameter correction to the initial operational parameter setpoint; and instruct, using the processor, the electrically operated radiation source to adjust operation based at least in part on the corrected operational parameter setpoint.

A third embodiment describes a method that includes determining, using a control system, a first neutron output factor based at least in part on a high voltage supplied to a target in a neutron generator and a first actual beam current of the neutron generator, in which the first actual beam current includes number of ions that impact the target per unit time; determining, using the control system, a second neutron output factor based at least in part on a grid current supplied to an ion source of the neutron generator; determining, using the control system, a third neutron output factor based at least in part on temperature of the neutron generator; determining, using the control system, a fourth neutron output factor based at least in part on leakage current in the neutron generator, in which the leakage current includes electrical power not used to produce and accelerate ions toward the target; and determining, using the control system, a neutron output based at least in part on the first neutron output factor, the second neutron output factor, the third neutron output factor, and the fourth neutron output factor, in which the determined neutron output is used to adjust operational parameter setpoints of the neutron generator.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
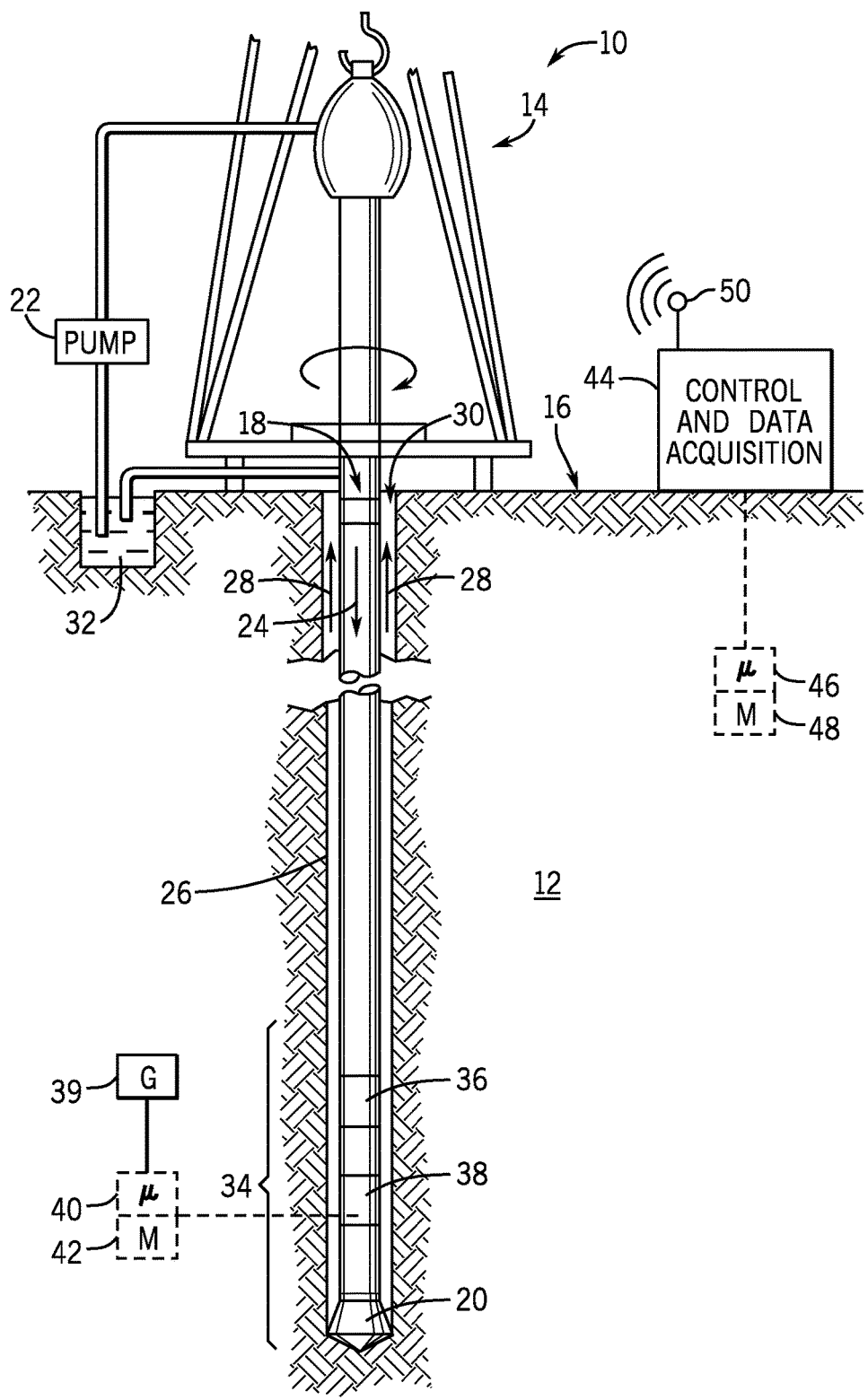
FIG. 1 is a schematic diagram of a drilling system including a downhole tool with an electrically operated radiation generator, in accordance with an embodiment of the present techniques.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electrically operated radiation source may generate and output radiation into its surroundings. For example, the electrically operated radiation source may be an x-ray generator, a gamma ray generator, or a neutron generator, to provide a few examples. Based on radiation measured by a sensor, characteristics of the surroundings may be determined. For example, porosity of a formation surrounding a neutron generator may be determined based at least in part on count rate (e.g., number of neutrons) measured by a detector.

Generally, an electrically operated radiation source may supply power to a source, thereby producing electrons. In neutron generators, the electrons may ionize hydrogen (e.g., deuterium and/or tritium) molecules and/or atoms. The ions or electrons may then be accelerated toward a target using an electric field. Upon impact, kinetic energy of the ion or electron is converted into radiation. For example, in an x-ray or gamma-ray generator, the electrons may impact the target, thereby releasing energy as x-ray or gamma-ray photons. Additionally, in a neutron generator, the hydrogen ions may impact the target causing a fusion reaction, which releases a neutron.

In fact, the output of radiation may be controlled by adjusting operational parameters of the electrically operated radiation source. For example, in a neutron generator, the radiation output may be based at least in part on kinetic energy of the ions and/or number of ions that impact the target. As used herein, number of ions that impact the target per unit time is referred to as "beam current." Additionally, kinetic energy of the ions is generated by the electric field produced by a voltage difference between the ion source and the target. As such, the neutron output may be increased by increasing the high voltage supplied to the target and/or the beam current. On the other hand, the neutron output may be decreased by decreasing the high voltage supplied to the target and/or the beam current.

However, adjusting operational parameters may also impact the useful life, reliability, and/or power consumption of the electrically operated radiation source. For example, increasing the beam current may increase sputter erosion of the target, thereby reducing the useful life of the electrically operated radiation generator. Additionally, increasing the high voltage supplied may increase electrical stress on an electrical system (e.g., power supply and insulation), increase failure rates, and increase occurrence of leakage current. Furthermore, increasing beam current and/or high voltage supplied may increase power consumption by the electrically operated radiation source.

Accordingly, techniques described herein may improve operation of electrically operated radiation sources by determining operational parameters to manage any combination of radiation output, useful life, reliability, environment, and/or power constraints. As will be described in more detail below, some embodiments describe a pulsed neutron generator (PNG). More specifically, the neutron generator may include a gas reservoir that produces hydrogen isotopes (e.g., deuterium and/or tritium) based at least in part on electrical power supplied to a filament in the gas reservoir. Generally, the pressure in the gas reservoir may be used to control the beam current. An ion source may then produce hydrogen ions by bombarding the hydrogen isotopes with electrons based at least in part on electrical power supplied to a grid. Based on a voltage difference between the ion source and the target, the hydrogen ions may be accelerated toward the target to produce a neutron output.

As such, setpoints of the operational parameters (e.g., beam current, grid electrical power, high voltage, and/or neutron output) of the pulsed neutron may be determined based at least in part on desired objectives (e.g., a desired neutron output, a desired useful life, and a desired reliability) and/or constraints (e.g., total power consumption limit and power loss limit). In some embodiments, the adjustment to the operational parameter setpoints may be based at least in part on empirically defined relationships between the various operational parameters and/or between the operational parameters and the desired objectives.

However, as described above, there may be tradeoffs when adjusting the various operational parameters. For example, when the beam current setpoint is increased, the neutron output may be increased, but the power consumption is also increased. As such, the operational parameter setpoints may be determined to balance the various objectives subject to any hard constraints (e.g., total power consumption limit). In fact, in some embodiments, the various objectives may be weighted to enable more important objectives to be more closely satisfied. In this manner, the operation of an electrically operated radiation generator may be controlled to manage any combination of radiation output, useful life, reliability, and/or power consumption Electrically Operated Radiation Generators As described above, electrically operated radiation generators may be utilized in downhole tools. To help illustrate, a drilling system 10 used to drill a well through subsurface formations 12 is described in FIG. 1. In the depicted embodiment, a drilling rig 14 at the surface 16 may rotate a drill string 18, which includes a drill bit 20 at its lower end to engage the subsurface formations 12. To cool and/or lubricate the drill bit 20, a drilling fluid pump 22 may pump drilling fluid, commonly referred to as "mud" or "drilling mud," downward through the center of the drill string 18 in the direction of the arrow 24 to the drill bit 20. At the drill bit 20, the drilling fluid may then exit the drill string 18 through ports (not shown). The drilling fluid may then flow in the direction of arrows 28 through an annulus 30 between the drill string 18 and the formation 12 toward the surface 16. In this manner, the drilling fluid may carry drill cutting away from the bottom of a borehole 26. Once at the surface 16, the return drilling fluid may be filtered and conveyed back to a mud pit 32 for reuse.

Additionally, as depicted, the lower end of the drill string 18 includes a bottom-hole assembly 34 that includes the drill bit 20 along with various downhole tools, such as a measuring-while-drilling (MWD) tool 36 and a logging-while-drilling (LWD) tool 38. Generally, the various downhole tools (e.g., MWD tool 36 and LWD tool 38) may include various logging tools, measurement tools, sensors, devices, formation evaluation tools, fluid analysis tools, fluid sample devices, and the like to facilitate determining characteristics of the surrounding formation 12, such as porosity and/or mineralogy. For example, the LWD tool 38 may include an electrically operated radiation generator 39, which outputs radiation into the surrounding formation 12, and one or more radiation sensors, which may measure radiation returned from the surrounding formation 12.

To facilitate controlling operation of the electrically operated radiation generator 39, the LWD tool 38 may include one or more processor 40 and one or more memory 42. More specifically, the processor 40 may include one or more general purpose microprocessors, one or more application specific processors (ASICs), one or more field programmable logic arrays (FPGAs), or any combination thereof. Additionally, the memory 42 may be a tangible, non-transitory, computer-readable medium that stores instructions executable by and data to be processed by the processor 40. In other words, the memory 42 may include random access memory (RAM), read only memory (ROM), rewritable flash memory, hard drives, optical discs, and the like.

Additionally, the LWD tool 38 may be communicatively coupled to a control and data acquisition unit 44 or other similar surface equipment. More specifically, via mud pulse telemetry system (not shown), the LWD tool 38 may transmit measurements taken or characteristics determined to the control and data acquisition unit 44 for further processing. Additionally, in some embodiments, this may include wireless communication between the LWD tool 38 and the control and data acquisition unit 44. Accordingly, the control and data acquisition unit 44 may include a processor 46, memory 48, and a wireless unit 50.

Figure 2:
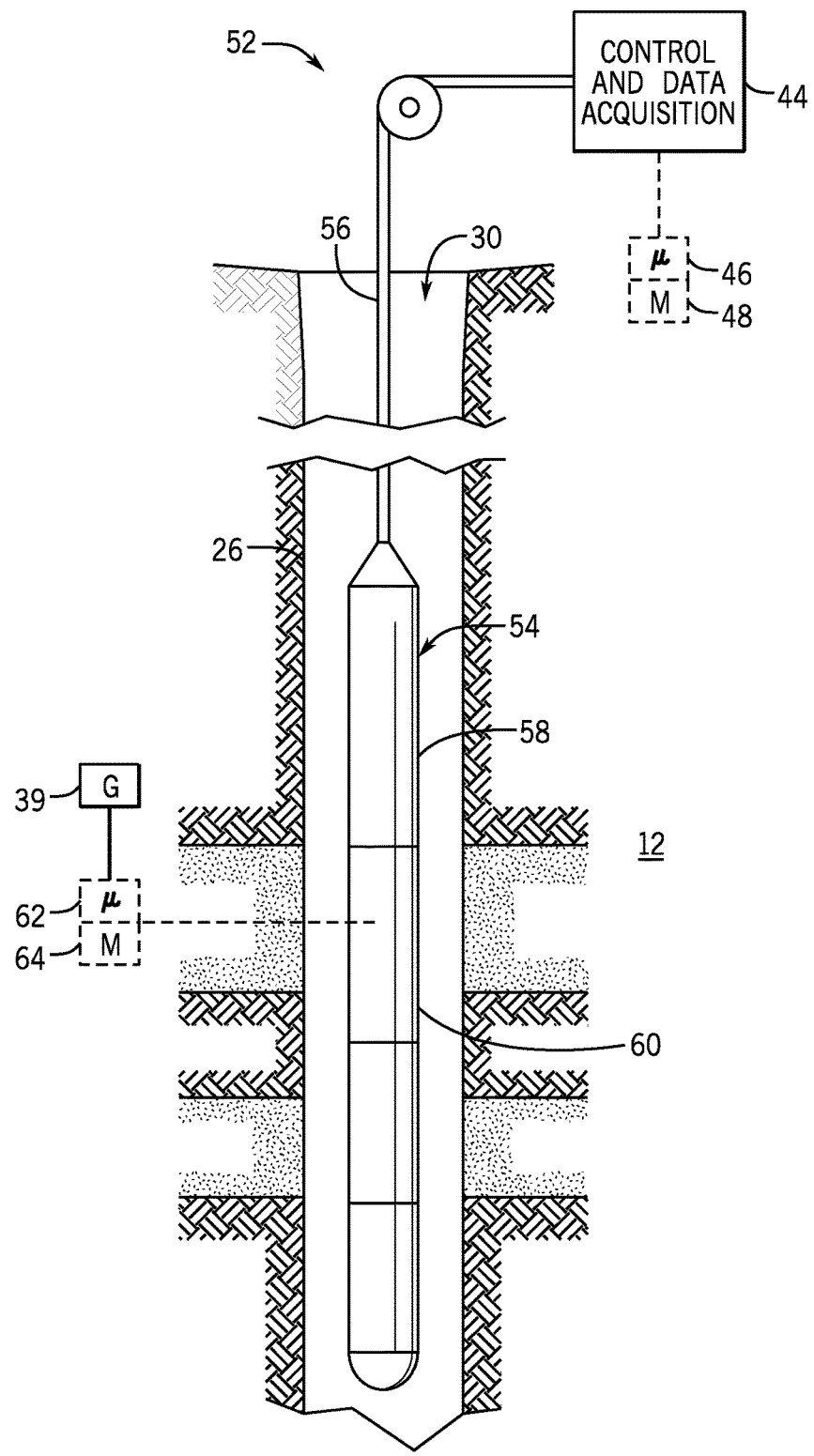
FIG. 2 is a schematic diagram of a wireline system including a downhole tool with an electrically operated radiation generator, in accordance with an embodiment of the present techniques.

In addition to being included in the drilling system 10, downhole tools (e.g., wireline tools) may also be included in a wireline system 52 as depicted in FIG. 2. In the depicted embodiment, the wireline system 52 includes a wireline assembly 54 suspended in the borehole 26 and coupled to the control and data acquisition unit 44 via a cable 56. Similar to the bottom-hole assembly 34, various downhole tools (e.g., wireline tools) may be included in the wireline assembly 54. For example, in the depicted embodiment, the wireline assembly 54 may include a telemetry tool 58 and a formation testing tool 60.

In some embodiments, the formation testing tool 60 may take measurements and communicate the measurements to the telemetry tool 58 to determine characteristics of the formation 12. For example, similar to the LWD tool 38, the formation testing tool 60 may include an electrically operated radiation generator 39, which outputs radiation into the surrounding formation 12, and one or more radiation sensors, which may measure radiation returned from the surrounding formation 12.

Additionally, to facilitate controlling operation of the electrically operated radiation generator 39, the formation testing tool 60 may include one or more processor 62 and one or more memory 64. More specifically, the processor 62 may include one or more general purpose microprocessors, one or more application specific processors (ASICs), one or more field programmable logic arrays (FPGAs), or any combination thereof. Additionally, the memory 64 may be a tangible, non-transitory, computer-readable medium that stores instructions executable by and data to be processed by the processor 62. In other words, the memory 64 may include random access memory (RAM), read only memory (ROM), rewritable flash memory, hard drives, optical discs, and the like.

As used herein, a "processor" refers to any number of processor components related to the downhole tool (e.g., LWD tool 38 or formation testing tool 60). For example, in some embodiments, the processor 40 or 62 may include one or more processors disposed within the downhole tool 38 or 60 communicatively coupled with one or more processors in surface equipment (e.g., control and data acquisition unit 44). Thus, any desirable combination of processors may be considered part of the processor 40 or 62 in the following discussion.

In other embodiments, features illustrated in FIGS. 1 and 2 may be employed in a different manner. For example, various downhole tools may also be conveyed into a borehole via other conveyance methods, such as coil tubing or wired drill pipe. For example, a coil tubing system may be similar to the wireline system 52 with the cable 56 replaced with a coiled tube as a method of conveyance, which may facilitate pushing the downhole tool further down the borehole 26.

Figure 3:
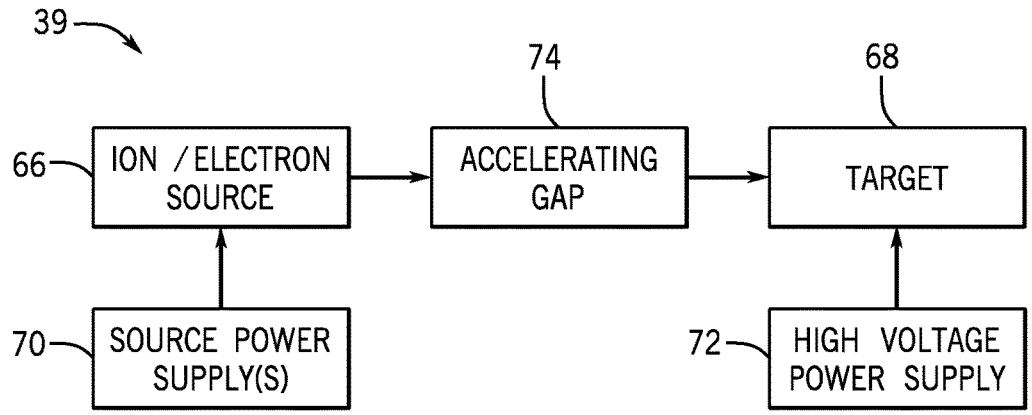
FIG. 3 is a block diagram of an electrically operated radiation generator, in accordance with an embodiment of the present techniques.

As described above, to facilitate determining characteristics of the formation 12 surrounding the borehole 26, an electrically operated radiation generator 39 may generate and output radiation into the formation 12. To help illustrate, a block diagram of an electrically operated radiation generator 39 is described in FIG. 3. As depicted, the electrically operated radiation generator 39 includes an ion/electron source 66, a target 68, one or more source power supplies 70, a high voltage power supply 72, and an accelerating gap 74.

Generally, the one or more source power supplies 70 may supply electrical power to the components in the ion/electron source 66. For example, as will be described in more detail below, electrical power may be supplied to a cathode in the ion/electron source 66 to enable the cathode to output electrons. Additionally, in a neutron generator, electrical power may be supplied to a grid in the ion/electron source 66 to enable the electrons to ionize hydrogen isotopes. Furthermore, the high voltage power supply 72 may supply electrical power to the target 68. As will be described in more detail below, the high voltage may produce an electric field through that accelerates the electrons and/or ions through the accelerating gap 74 toward the target 68. Upon impact, radiation (e.g., photons or neutrons) may be output from the target 68.

Figure 3A:
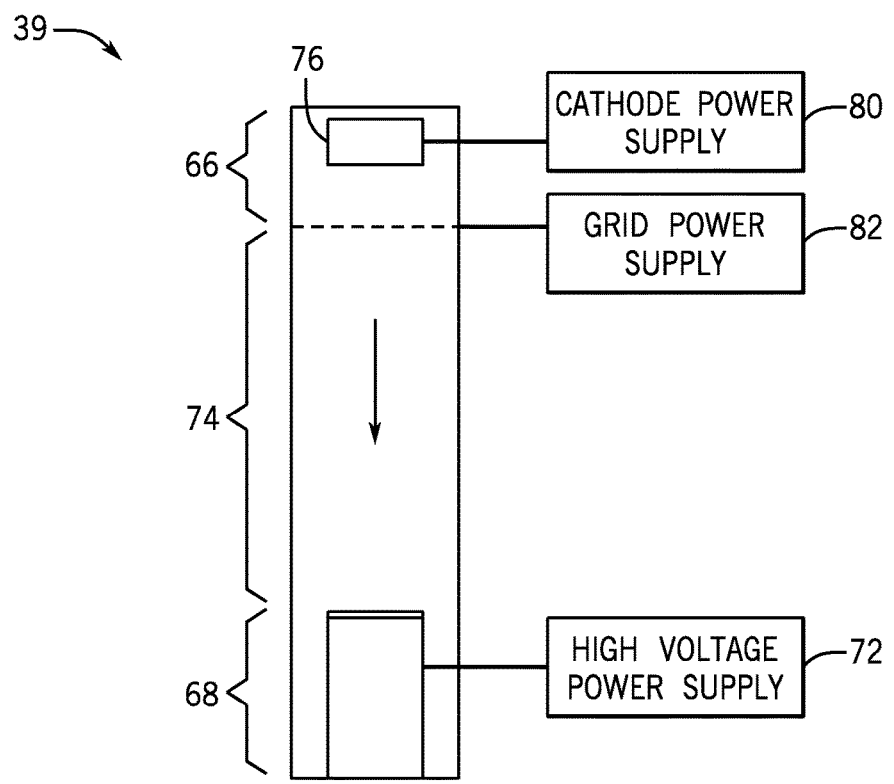
FIG. 3A is a schematic diagram of an x-ray generator, in accordance with an embodiment of the present techniques.

As described above, various types of electrically operated radiation sources may be used, such as an x-ray generator or a neutron generator. Although producing different types of radiation, the various types of electrically operated radiation sources may be operationally similar. To help illustrate, a schematic diagram of an x-ray generator 39A (e.g., a 100 kV, 200 kV, 300 kV, 400 kV, or higher x-ray generator) that may be used in a downhole tool is described in FIG. 3A. As depicted, the x-ray generator 39A includes a cathode 76 and a grid 78 in the ion/electron source 66. Additionally, to supply power to the ion/electron source 66, the x-ray generator 39A includes a cathode power supply 80 and a grid power supply 82. Furthermore, the x-ray generator 39A includes a target film 82 in the target 68 and the high voltage power supply 72.

In operation, the cathode power supply 80 may supply an electrical power to the cathode 76 to enable the cathode 76 to output electrons. In some embodiments, the cathode 76 may be a hot-cathode that output electrons when heated. For example, when the cathode power supply 80 supplies electrical power at 2 amps and 2 volts, the cathode 76 may increase in temperature, thereby releasing thermionic electrons.

Additionally, the grid power supply 82 may supply electrical power to the grid 78 to facilitate moving the released electrons toward the accelerating gap 74. In some embodiments, the grid power supply 82 may supply a positive voltage (e.g., 200 volts) to the grid 78 so that an electric field is produced between the grid 78 and the cathode 76, which causes the electrons to move through the grid 78 and into the accelerating gap 74.

As such, the rate at which electrons move into the accelerating gap 74 may be based at least in part on the electrical power supplied by the cathode power supply 80 and/or the grid power supply 82. For example, increasing electrical power supplied by the cathode power supply 80 may increase the rate the cathode 76 releases electrons, thereby increasing the number of electrons that enter the accelerating gap 74 and accelerated toward the target 68. In other words, the beam current (e.g., number of electrons that impact the target 68 per unit time) may be controlled by adjusting electrical power supplied by the cathode power supply 80 and/or the grid power supply 82.

On the other end of the accelerating gap 74, the high voltage power supply 72 supplies a high voltage to the target 68. In some embodiments, the high voltage power supply 72 may supply a high negative voltage (e.g., −100 kV) to the target 68 so that a strong electric field is produced across the accelerating gap 74, which accelerates the electrons. As such, the kinetic energy of the electrons as they collide with the target film 82 may be based at least in part on the magnitude of the high voltage supplied by the high voltage power supply 72 to the target 68.

Figure 3B:
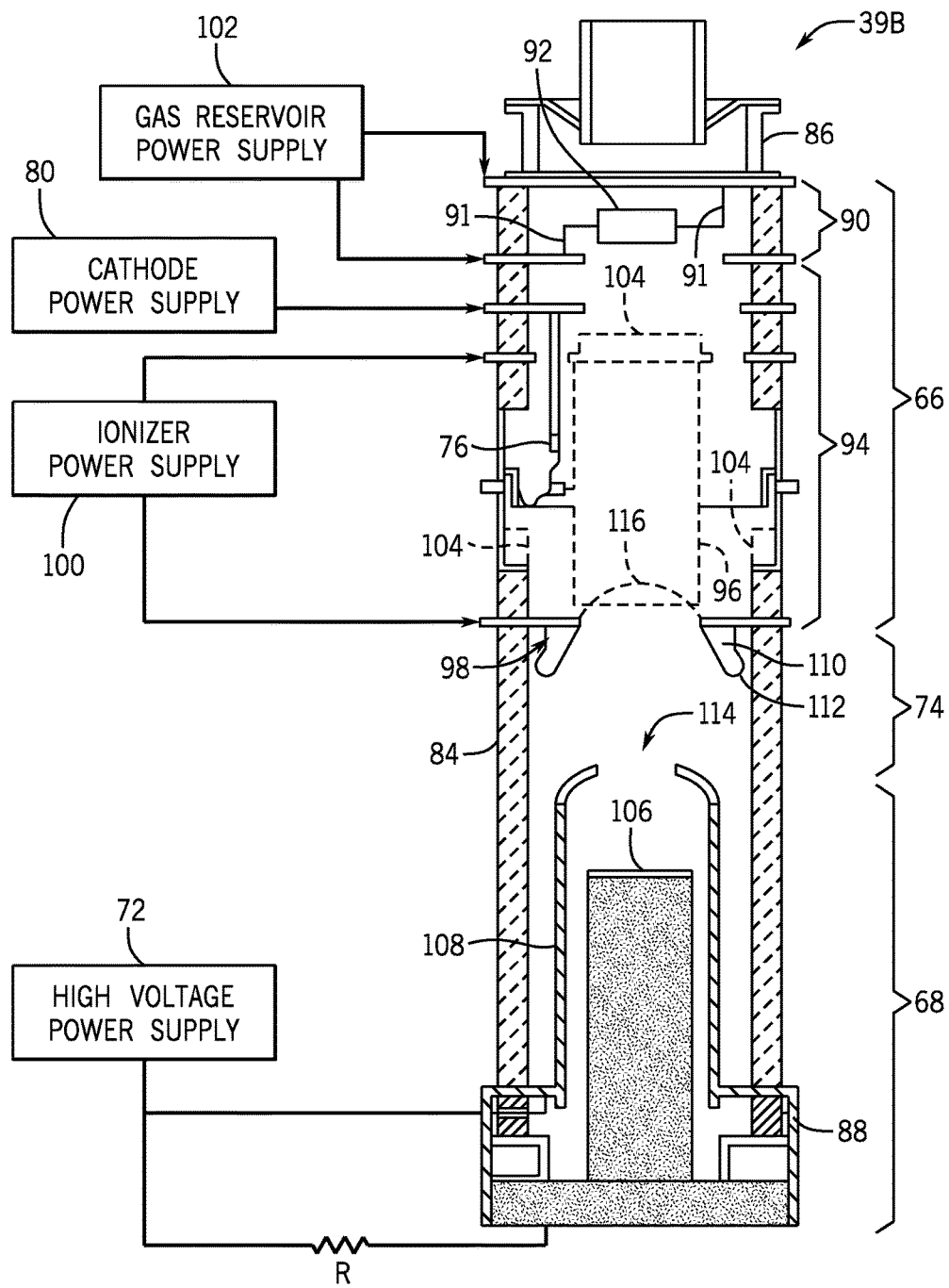
FIG. 3B is a schematic diagram of a neutron generator, in accordance with an embodiment of the present techniques.

As described above, an electrically operated radiation source may be a neutron generator. To help illustrate, a schematic diagram of a neutron generator 39B is described in FIG. 3B. As depicted, the neutron generator 39B includes a hollow cylindrical tube 84 made of an insulating material, such as alumina ceramic $Al_2O_3$, coupled at either end to an insulating (e.g., ceramic) ring 86 and a conductive ring 88 to provide a gas-tight, hermetic cylindrical envelope.

Within the cylindrical tube 82, the neutron generator 39B includes a gas reservoir 90, which includes a filament 91 and a getter 92, and an ionizer 94, which includes a cathode 76, an anode 96, and an extractor electrode 98, in the ion/electron source 66. Additionally, a magnet 100 (e.g., electromagnet or permanent magnet) may be included in some embodiments of the neutron generator 39B, such as an ion/electron source 66 with a cold-cathode. To supply electrical power to the ion/electron source 66, the neutron generator 39B includes a cathode power supply 80, which supplies electrical power to the cathode 76, an ionizer power supply 100, which supplies electrical power to the anode 96 and the extractor electrode 98, and a gas reservoir power supply, which supplies electrical power to the filament 91.

More specifically, the getter 92 may be a porous material sintered with hydrogen (e.g., deuterium and/or tritium) isotopes. Additionally, the filament 91 may be an electrically resistive material (e.g., tungsten) helically wound. Thus, when the gas reservoir power supply 102 supplies electrical power to the filament 91, the filament 91 may increase in temperature causing the getter 92 to release the hydrogen isotopes as gas. As the getter 92 releases gas, pressure in the gas reservoir 90 may increase causing hydrogen gas to flow into the ionizer 94. Thus, the electrical power supplied to the filament 91 may be adjusted to vary the pressure in the gas reservoir 90 (e.g., between 1-20 mTorr), which, as will be described in more detail below, may control beam current. It should be understood that the gas reservoir 90 may be located anywhere in the ion source 66 and need not be positioned as in FIG. 3B. In fact, the gas reservoir 90 may be positioned outside of the ion source 66.

The hydrogen isotope gas may then be ionized in the ionizer 94. More specifically, when the cathode power supply 80 supplies electrical power to the cathode 76, the cathode 76 may output electrons. In some embodiments, the cathode 76 may be a thermionic (e.g., hot) cathode, which includes a porous substrate (e.g., tungsten) impregnated with a material susceptible to emitting electrons (e.g., barium oxide and/or strontium oxide). As such, when electrical power (e.g., a few watts) is supplied to the cathode 76, the cathode 76 may increase in temperature, thereby releasing electrons. In other embodiments, the cathode 76 may be a Penning (e.g., cold) cathode, which releases electrons without increasing temperature.

The electrons may then impact the isotopes to generate hydrogen ions. More specifically, when the ionizer power supply 100 supplies electrical power to the anode 96, an electrical field may be generated by a voltage difference between the anode 96 and the cathode 76, which causes the electrons to flow toward the anode 96. In some embodiments, the ionizer power supply 100 may supply the anode 96 a positive voltage (e.g., 80-300 volts) relative to a cathode 76. Thus, as the electrons are pulled toward the anode 96, the electrons may impact and excite the hydrogen isotopes, thereby generating positive hydrogen ions. In fact, the impact may cause a hydrogen isotope to expel an electron, which may then be pulled toward the anode 96 and impact other hydrogen isotopes.

The hydrogen ions may then be extracted into the acceleration gap 74. More specifically, the ionizer power supply 100 may supply the extractor electrode 98 a negative voltage relative to the anode 96. In this manner, an electrical field may be produced between the anode 96 and the extractor electrode 98 that guides the hydrogen ions toward the acceleration gap 74. In fact, the ionizer power supply 100 may pulse the negative voltage supplied to the extractor electrode 98 to pulse the neutron output.

Additionally, in some embodiments, one or more magnets 104 (e.g., an electromagnet or a permanent magnet) may generate a magnetic field parallel to the longitudinal axis of the tube 84. In this manner, the magnetic field may push the hydrogen ions toward the accelerating gap 74. In fact, in some embodiments, the magnetic field may cause the electrons to travel along a spiral or helical shaped trajectory, thereby increasing the length of the path they follow, and thus, the likelihood of each electron ionizing a hydrogen isotope.

As described above, the hydrogen ions may then be accelerated in the accelerating gap 74 toward the target 68. In the depicted embodiment, the neutron generator 39B includes a target film 106 and a suppressor electrode 108 in the target 68. Additionally, the neutron generator 39B includes a high voltage power supply 72 to supply electrical power to the suppressor electrode 94. More specifically, the high voltage power supply 72 may supply a high negative voltage (e.g., 80-100 kV) to the suppressor electrode 108 relative to the extractor electrode 98. In this manner, an electrical field is generated between the extractor electrode 98 and the suppressor electrode 108, which may accelerate the hydrogen ions toward the target film 106.

Moreover, in the depicted embodiment, the extractor electrode 98 may include a conductive body (e.g., nickel or an alloyed metal) 110, which diverges outwardly in a direction to from a torus-shaped contour 112. Additionally, a conductive (e.g., molybdenum) grid 116 may be formed as a dome across the extractor electrode body 110. In some embodiments, the shape of the body 110 and the grid 116 may reduce the likelihood of voltage breakdown caused by high electrical field gradients and shape the electric field to facilitate extraction and focusing of ions.

Furthermore, the grid 116 may reduce the likelihood of producing a tail neutron output when the ion source 66 is turned off. More specifically, the ionizer power supply 100 may supply voltage pulses (e.g., 100-300 volts) synchronized with and complementary to voltage pulses supplied to the anode 96. Additionally or alternatively, the ionizer power supply may supply a constant positive low voltage to the cut-off electrode 116. The positive voltage applied to the cut-off electrode 116 may reduce the likelihood of slow moving ions produced after the ion source 66 is turned off from entering the accelerating gap 74.

Additionally, in the depicted embodiment, the suppressor electrode 84 is concave and includes a central aperture 114 that enables the accelerated ions to move through the suppressor electrode 84 and impact the target film 106. In some embodiments, the target film 106 may be a thin film of titanium, scandium or other known hydride system. As such, when the ions collide with the atoms in the target film 106, a fusion reaction may occur, which releases high energy neutrons (e.g., 14 MeV). Furthermore, in the depicted embodiment, the high voltage source 72 may also be connected, through a resistor "R" to ground potential, which may reduce the likelihood of electrons being extracted from the target 68 upon ion bombardment.

As described above, the various operational parameters of an electrically operated radiation source 39 may affect radiation output, useful life, reliability, and/or power constraints of the electrically operated radiation source 39. To help illustrate, relationships based on the operational constraints will be described. To simplify the discussion, the following will be described in relation to a neutron generator 39B. However, those skilled in the art will recognize the ability to adapt the techniques described herein to other electrically operated radiation sources 39, such as the x-ray generator 39A.

Figure 4:
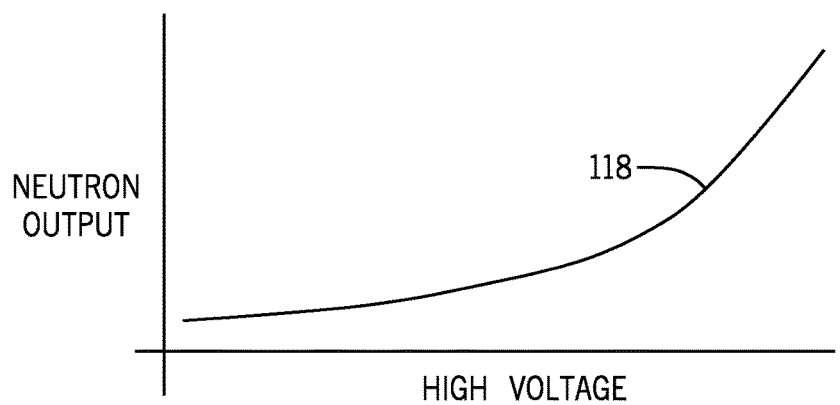
FIG. 4 is a plot of a relationship between high voltage and neutron output for a fixed beam current in the neutron generator of FIG. 3B, in accordance with an embodiment of the present techniques.
Figure 5:
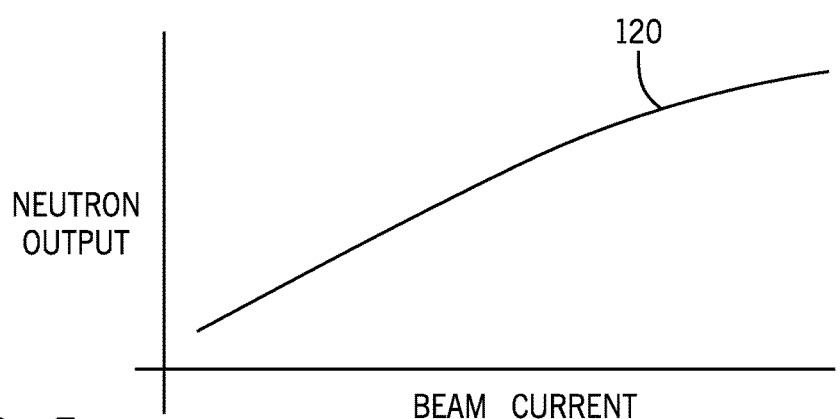
FIG. 5 is a plot of a relationship between beam current and neutron output for a fixed high voltage in the neutron generator of FIG. 3B, in accordance with an embodiment of the present techniques.
Figure 6:
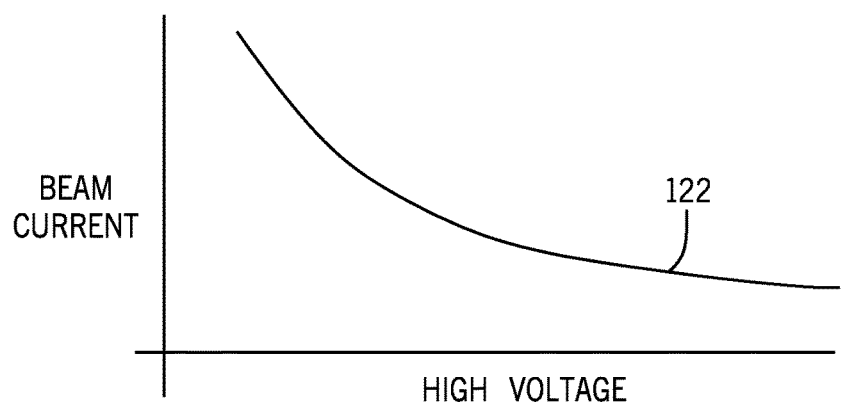
FIG. 6 is a plot of a relationship between high voltage and beam current for a constant neutron output in the neutron generator of FIG. 3B, in accordance with an embodiment of the present techniques.

In a neutron generator 39B, the neutron output may be controlled by adjusting the high voltage applied to the target 68 and/or the beam current. To help illustrate, FIG. 4 describes relationship between high voltage and neutron output using a first curve 118 constant beam current and FIG. 5 describes relationship between beam current and neutron output using a second curve 120 at constant high voltage. As depicted in FIG. 4, assuming that the beam current is constant, the neutron output generally varies approximately proportionally to the square of the high voltage. For example, the neutron output may be proportional to $(HV-35)^2$, where HV is the high voltage in kV. Additionally, as depicted in FIG. 5, assuming that the high voltage is constant, the neutron output generally varies approximately proportionally with the beam current. As such, FIG. 6 depicts a third curve 122 that describes the relationship between the high voltage and the beam current to maintain a constant neutron output.

Figure 7:
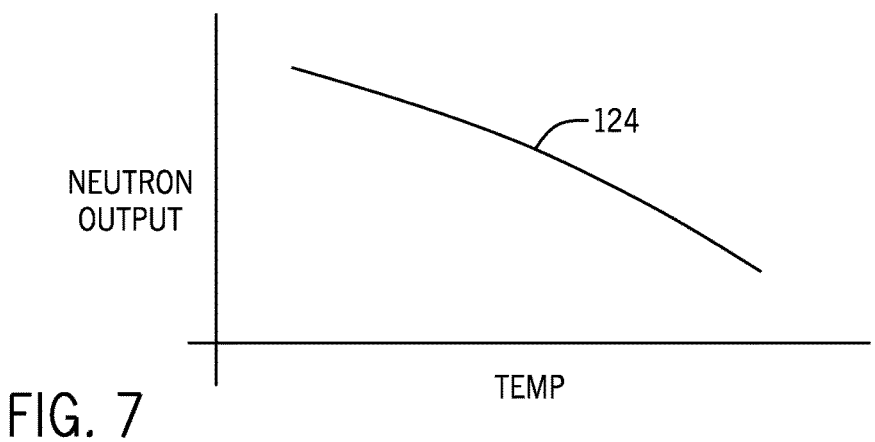
FIG. 7 is a plot of a relationship between temperature and neutron output with other parameters held constant in the neutron generator of FIG. 3B, in accordance with an embodiment of the present techniques.

However, the neutron output may also be affected by temperature of the neutron generator 39B. More specifically, an increase in temperature may cause desorption of fusion reactants in the target 68, thereby reducing the neutron output. To help illustrate, FIG. 7 describes the relationship between temperature and neutron output using a fourth curve 124. As depicted, the neutron output generally decreases as the temperature of the neutron generator 39B increases.

Figure 8:
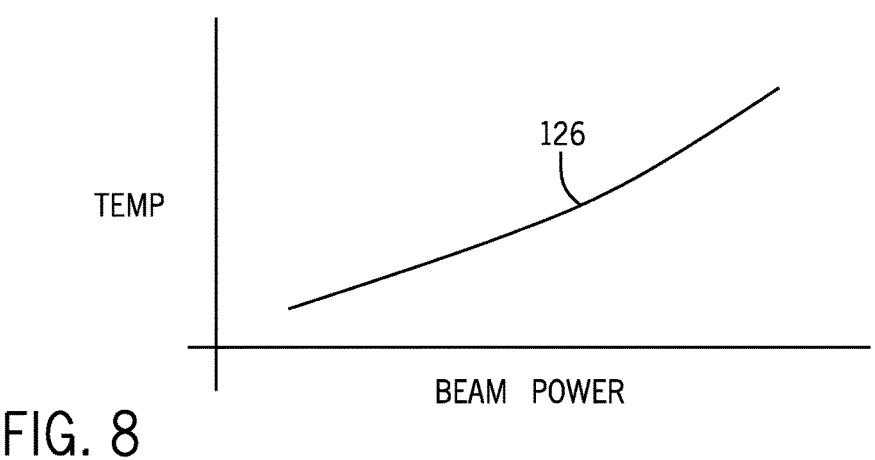
FIG. 8 is a plot of a relationship between beam power and temperature increase with other parameters held constant in the neutron generator of FIG. 3B, in accordance with an embodiment of the present techniques.

In addition to being affected by ambient temperatures, the temperature of the neutron generator 39B may be affected by the electrical power deposited in the target 68. More specifically, at least a portion of the kinetic energy of the hydrogen ions may be converted into heat. As described above, the kinetic energy of the hydrogen ions may be based at least in part on the beam current and the high voltage applied to the target 68. To help illustrate, FIG. 8 describes the relationship between beam power (e.g., beam current*high voltage) and temperature increase using a fifth curve 126. As depicted, the amount of temperature increase is generally approximately proportionally to the beam power.

Figure 9:
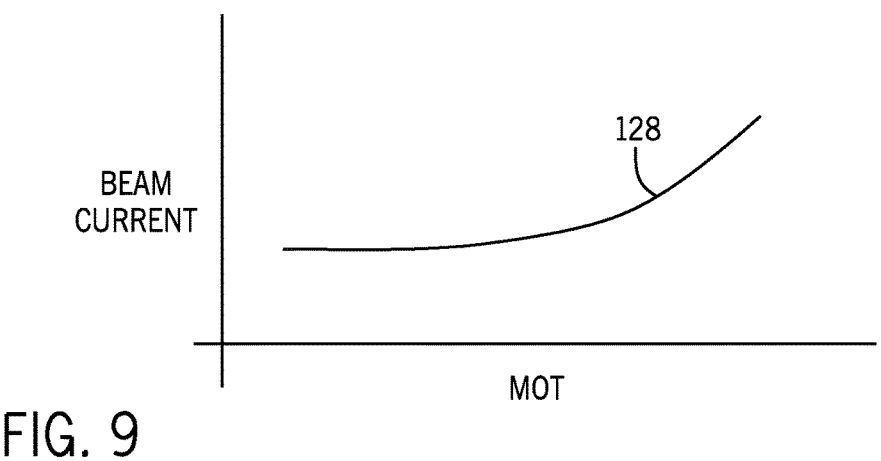
FIG. 9 is a plot of a relationship between Minitron on time (MOT) and beam current with other parameters held constant in the neutron generator of FIG. 3B, in accordance with an embodiment of the present techniques.

Furthermore, the neutron output of the pulsed neutron generate 39B may be affected by its age (e.g., radiation generator on-time). More specifically, as the neutron generator 39B operates, bombarding the target 68 with high energy ions may cause the target 68 to eject atoms (e.g., sputter). Given the limited amount of metal-hydride available, the rate of production of neutrons from fusion reactions may decrease as the metal-hydride is depleted. As such, to maintain a constant neutron output, the intensity of the beam current may be increased. To help illustrate, FIG. 9 describes the relationship between beam current and radiation generator on-time (MOT) using a sixth curve 128. Accordingly, as depicted, to maintain a constant neutron output, the intensity of the beam current (e.g., at fixed high voltage) may be increased.

Figure 10:
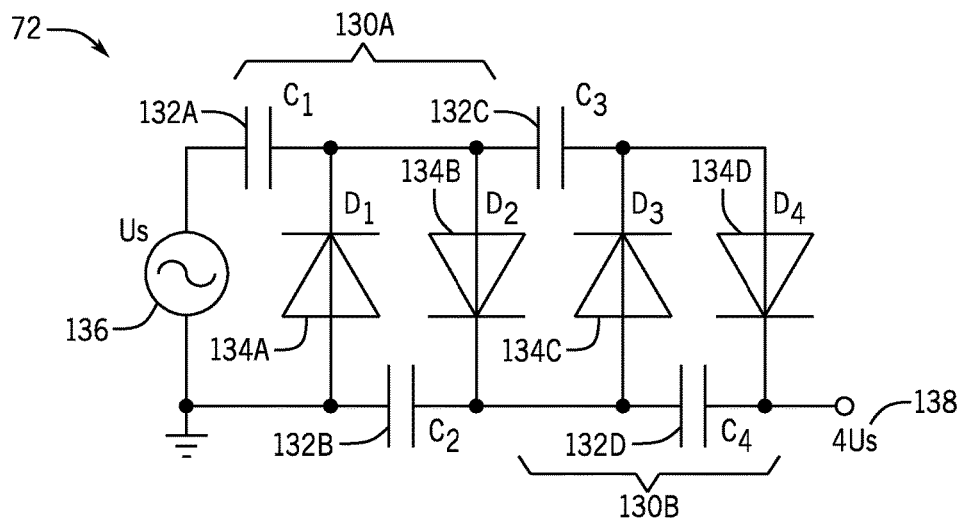
FIG. 10 is an electrical schematic diagram of a high voltage power supply, in accordance with an embodiment of the present techniques.

As described above, the high voltage power supply 72 may supply a high voltage (e.g., 100 kV and even up to 500 kV) to the electrically operated radiation generator (e.g., neutron generator 39B). One embodiment of a high voltage power supply 72 is described in FIG. 10 (e.g., based on a Cockcroft-Walton voltage multiplier design). More specifically, the high voltage power supply 72 may use a ladder-like structure of stages 130 as a voltage multiplier. In the depicted embodiment, each stage 130 includes two capacitors 132 and two diodes 134 in the arrangement shown. For example, the high voltage power supply 72 includes a first stage 130A that includes a first capacitor 132A, a second capacitor 132B, a first diode 134A, and a second diode 134B. Additionally, the high voltage supply 72 includes a second stage 130B that includes a third capacitor 132C, a fourth capacitor 132D, a third diode 134C, and a fourth diode 134D.

As such, when an alternating current (AC) input power 136 is supplied to the high voltage power supply 72 (e.g., from a transformer), each stage may output a direct current (DC) voltage. More specifically, the voltage output by the n-th stage may be n times twice the peak-to-peak voltage of the AC input power 136. For example, the output voltage 138 of the second stage 130B may be four times the peak-to-peak voltage of the AC input power 136. In some embodiments, a voltage divider (e.g., "bleed") resistor chain (not shown) may be included to measure the output voltage 138.

Figure 11:
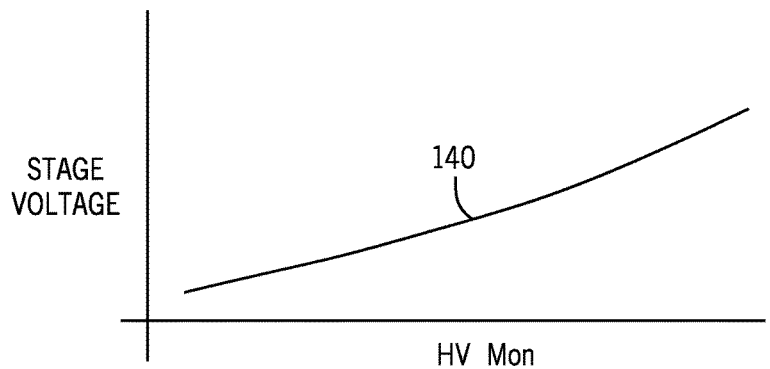
FIG. 11 is a plot of a relationship between the high voltage output of the high voltage power supply and the voltage output of each stage in the high voltage power supply of FIG. 10, in accordance with an embodiment of the present techniques.
Figure 12:
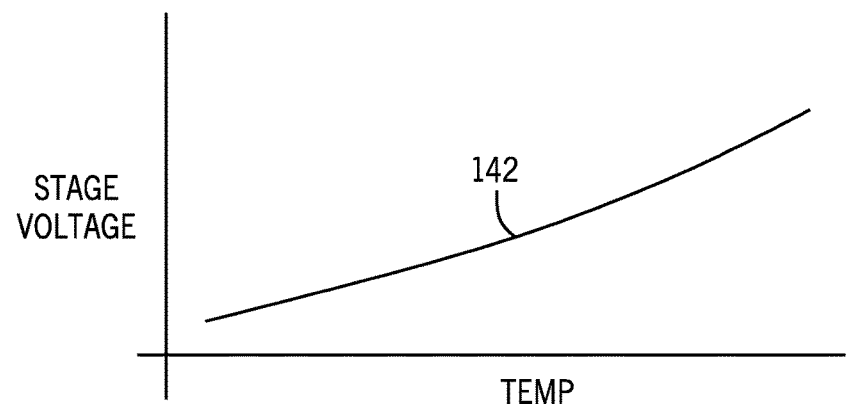
FIG. 12 is a plot of a relationship between temperature of the neutron generator and the voltage output of each stage for constant high voltage power supply output, in accordance with an embodiment of the present techniques.

Thus, to increase the high voltage power supply 72 output voltage 138, the voltage at each stage 130 may also increase. To help illustrate, FIG. 11 describes the relationship between the output voltage and the voltage at each stage 138 using a sixth curve 140. As depicted, the voltage at each stage 138 increases non-linearly as the output voltage 138 increases. Additionally, increasing the output voltage 138 may cause the temperature of the high voltage power supply 72 to increase. To help illustrate, FIG. 12 describes the relationship between temperature and the voltage at each stage using a seventh curve 142. As depicted, the maximum voltage at each stage 138 increases non-linearly as the temperature increases. However, capacitors 132 are generally designed to a specific voltage rating. Capacitors of the type typically used in these high voltage power supplies are of a ceramic dielectric material which experiences a reduction in capacitance with the application of either/both temperature and voltage. Thus, as the stage voltage is increased (to achieve a higher output voltage), the capacitor will become less efficient at holding off charge at a given voltage. A similar result can be seen with the application of temperature. Therefore, to sustain a given high voltage output at a given temperature under inefficient operating conditions, the stage voltage must be increased. As this voltage nears the voltage rating the capacitor was designed to meet, the margin for reliable operation decreases.

Figure 13:
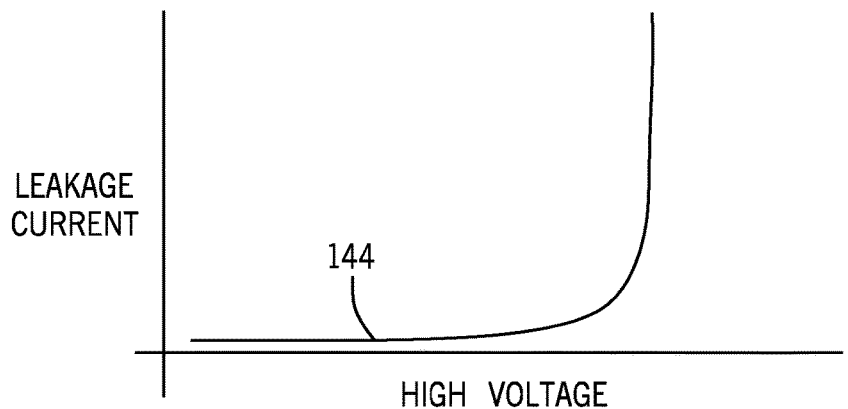
FIG. 13 is a plot of a relationship between high voltage output and leakage current, in accordance with an embodiment of the present techniques.

Furthermore, as the output voltage 138 and/or the temperature increases, the leakage current in the diodes 134 may increase, which further decreases the efficiency with which the high voltage power supply 72 generates the output voltage 138. A similar effect of decreasing reliable operating margin takes place. FIG. 13 describes another neutron tube-specific relationship between the applied output voltage 138 (e.g., high voltage or accelerative voltage) and leakage current using an eighth curve 144. In this instance, it may be observed that the leakage current increases exponentially compared to the high voltage.

Figure 14:
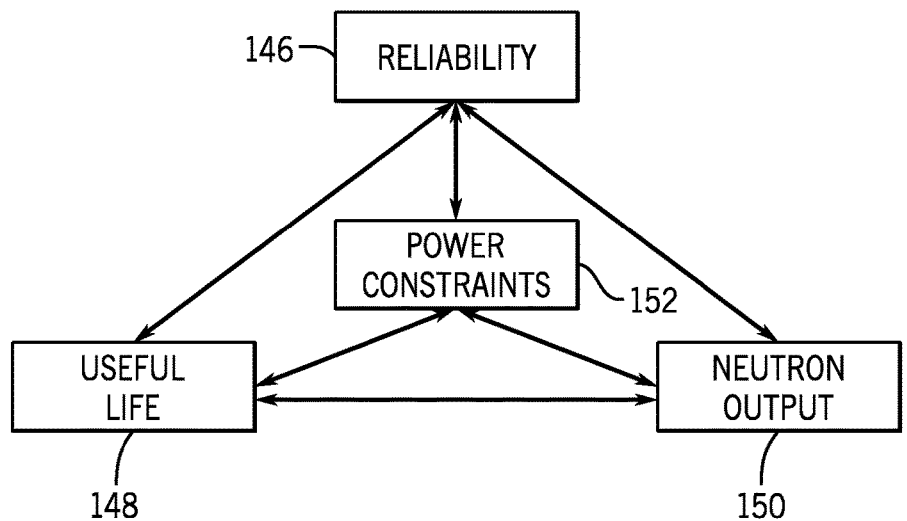
FIG. 14 is a conceptual block diagram for managing useful life, reliability, and neutron output, in accordance with and embodiment

As illustrated by the relationships described above, there may be qualitative trade-offs when adjusting the operational parameters. The exact quantitative relationships may be determined experimentally for each specific electrically operated radiation generator. More specifically, as described in FIG. 14, the various operational parameters of the neutron generator 39B may be controlled based at least in part on trade-offs between useful life 148, reliability 146, and/or neutron output 150. For example, the high voltage output supplied may increase the neutron output, but may also decrease the reliability of the high voltage power supply 72 and/or its electrical insulation system.

Additionally, as can be appreciated, the adjustment of operational parameters may affect power consumption of the neutron generator 39B. For example, when the high voltage supplied to the target 68 is increased, the power consumption may also increase. Thus, the various operational parameters of the neutron generator 39B may also be controlled subject to power constraints 152, particularly when the neutron generator 39B is used in a downhole tool 38 or 60 with limited electrical power.

Electrically Operated Radiation Generator Control System

Figure 15:
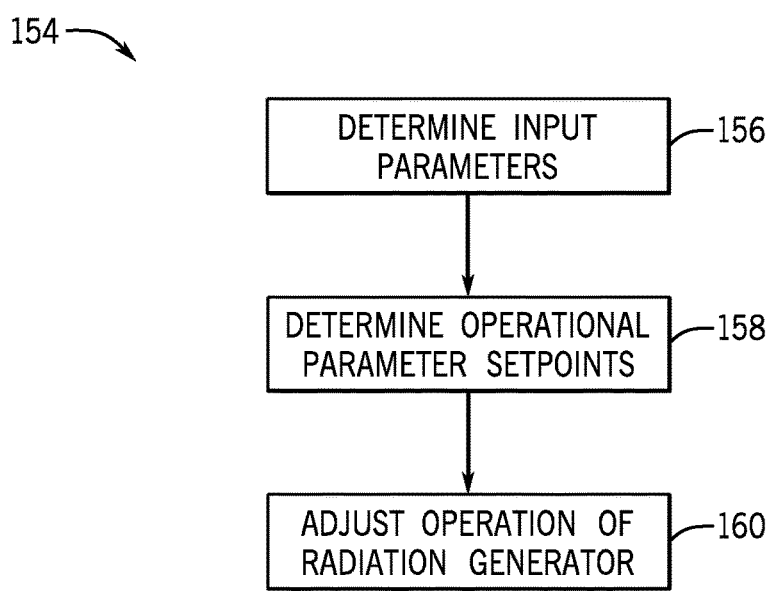
FIG. 15 is a process flow diagram for controlling operation of the electrically operated radiation source, in accordance with an embodiment of the present techniques.

As such, operation of an electrically operated radiation generator 39 may be improved by operating the electrically operated radiation generator 39 based on desired objectives (e.g., desired useful life, desired reliability, and/or desired radiation output) subject to constraints (e.g., power constraints). One embodiment of a process 154 for controlling operation of an electrically operated radiation generator 39 is described in FIG. 15. Generally, the process 154 includes determining input parameters (process block 156), determining operational parameter setpoints (process block 158), and adjusting operation of the electrically operated radiation generator (process block 160). In some embodiment, process 154 may be implemented by instructions stored on a tangible, non-transitory, computer-readable medium, such as memory 42, 48, or 64, executed by processing circuitry, such as processor 40, 46, or 62.

Figure 16:
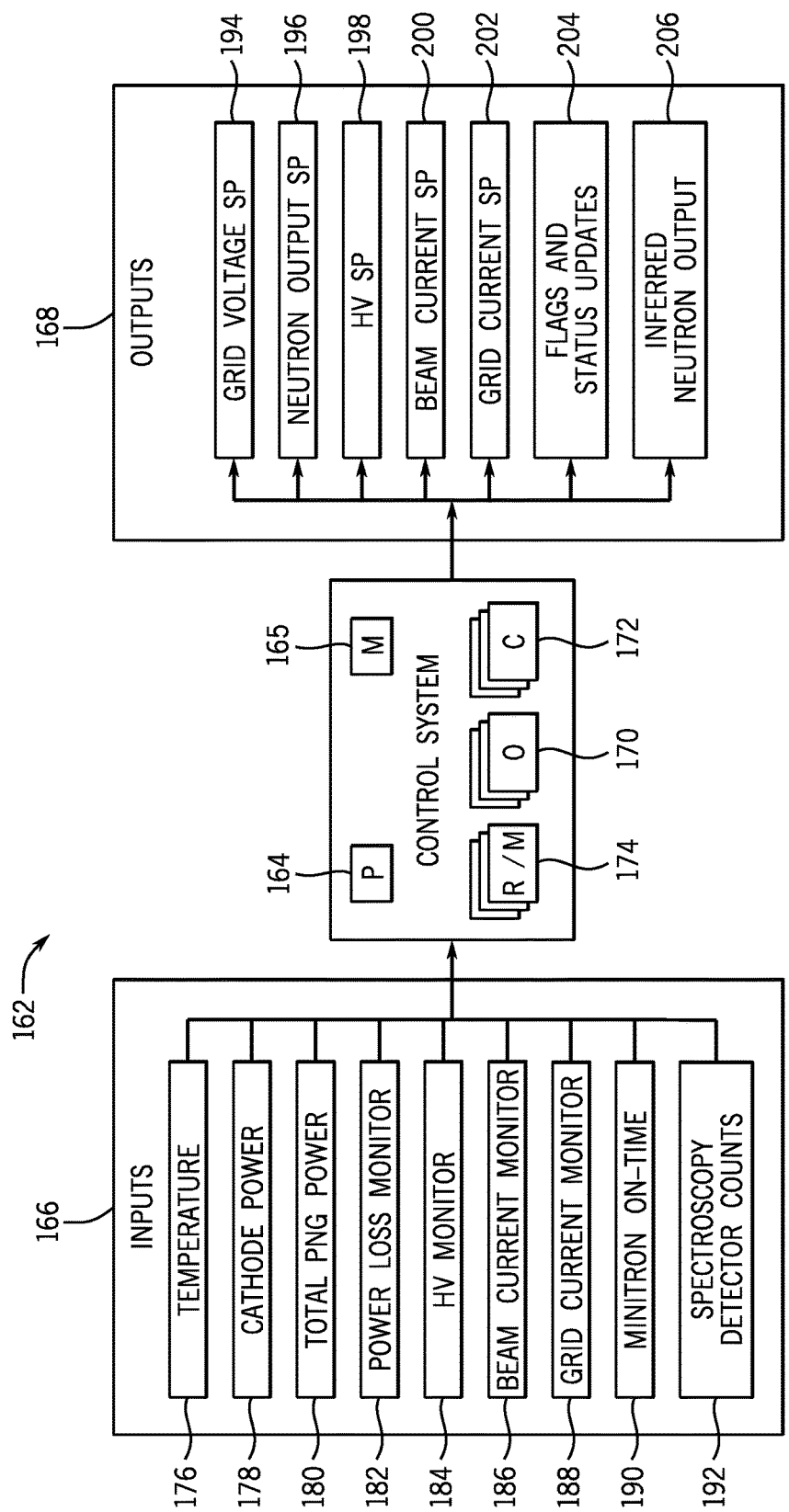
FIG. 16 is a block diagram of a control system used to control operation of the neutron generator of FIG. 3B, in accordance with an embodiment of the present techniques.

To help illustrate, a block diagram of a control system 162 that may implement the process 154 with regard to a neutron generator 39B is described in FIG. 16. As depicted, the control system 162 includes processing circuitry processing circuitry 164, which may include processor 40, 46, or 62, and memory 165, which may include memory 42, 48, or 64. More specifically, the control system 162 may receive input parameters 166 (process block 156), for example, from various sensors positioned in the electrically operated radiation generator 39.

Based on the input parameters 166, the control system 162 may determine operational parameter setpoints based at least in part on one or more desired objectives 170, one or more constraints 172, and one or more rules and/or models 174 (process block 158). In some embodiments, the processing circuit 164 may utilize proportional-integral-derivative (PID) regulation loops to determine the operational setpoints. More specifically, each control loop may determine an error term between a current (e.g., measured) value and the determined setpoint. In fact, in some embodiments, there is an emphasis on integral (I) gain correction, which enables more gradual changes. The corrections may either incrementally increase or decrease the determined operational setpoint subject to the constraints.

In some embodiments, the PID regulation loops may be implemented in either hardware or software. Hardware regulation, because of its speed of response, may be particularly beneficial for high voltage regulation where resulting electrical stress leaves little margin for error. In other embodiments, the control circuitry 164 may instruct the components to adjust operation using a simple step change response and/or a direct calculation of the new value using an empirical or physical model. The control system 162 may then instruct components in the neutron generator 39B to implement the determined operational parameter setpoints (process block 160).

In the depicted embodiment, the input parameters 166 may include temperature 176 of the neutron generator 39B, electrical power 178 supplied to the cathode 76, total power consumption 180 of the neutron generator 39B, power loss 182 in the high voltage generator 72, the high voltage 184 supplied to the target 68, beam current 186, grid current 188 supplied to the ion source 66, neutron generator on-time 188, and spectroscopy detector counts 192. Generally, the input parameters 166 may be determined using one or more sensors, such as pressure sensors, temperature sensors, voltage sensors, current sensors, radiation sensors, or any combination thereof.

As described above, the control system 162 may determine the operational parameter setpoints 168 based at least in part on the one or more rules and/or models 174, the one or more desired objectives 170, and the one or more constraints 172. As in the depicted embodiment, the operational parameter setpoints 168 may include a grid voltage setpoint 194, a neutron output setpoint 196, a high voltage setpoint 198, a beam current setpoint 200, and a grid current setpoint 202. Based on the input parameters 166, the control system 162 additionally may update flags 204 to indicate status of the neutron generator 39B (e.g., when the total power consumption limit is reach and/or when the power loss limit is reached) and determine inferred neutron output 206 when not directly measured.

More specifically, the operational parameter setpoints 168 may be determined based at least in part on constraints that limit acceptable values of the operational parameter setpoints 168. For example, an operational parameter may be constrained between a "floor" value and a "ceiling" value. More specifically, the floor value may be a lower limit to which the operational parameter may be set while meeting what is considered to be a minimum acceptable level performance (e.g., as measured by one or more performance parameters such as neutron output). On the other hand, the ceiling value may be an upper limit to which the operational parameter may be set while meeting acceptable reliability and/or useful life objectives. In some embodiments, such constraints may be determined empirically, for example, off-line using training sets or on-line using actual data.

Additionally, the operational parameter setpoints 168 may be determined based at least in part on one or more rules and/or models 174. More specifically, the one or more rules and/or models 174 may be determined to quantify the relationships (e.g., described in FIGS. 4-9 and 11-13) between the operational parameters, desired objectives 170, and constraints 172. For example, the output of the one or more rules and/or models 174 may be a correction (e.g., recalculation) to the operational parameter setpoints 168. In some embodiments, the one or more rules 174 may be determined empirically, for example, off-line using training sets or on-line using actual data.

Figure 17:
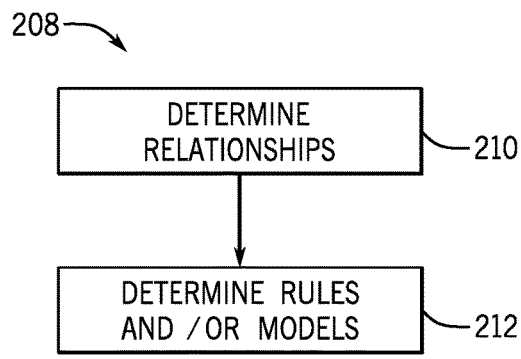
FIG. 17 is a process flow diagram for determine one or more rules and/or models, in accordance with an embodiment of the present techniques.

One embodiment of a process 208 for determining the one or more rules and/or models 174 is described in FIG. 17. Generally, the process 208 includes determining the relationships between the operational parameters, objectives, and constraints (process block 210) and determining one or more rules and/or model (process block 212). In some embodiment, process 208 may be implemented by instructions stored on a tangible, non-transitory, computer-readable medium, such as memory 42, 48, or 64, executed by processing circuitry, such as processor 40, 46, or 62. To help illustrate, examples of rule and/or models 174 that may be determined based on the empirically determined relationships described in FIGS. 4-9 and 11-13 are described below. Determining High Voltage Setpoint Generally, the high voltage supplied to the target 68 may be determined based on age (e.g., radiation generator on-time) of the neutron generator 39B. More specifically, as the neutron generator 39B ages, a sputtering coat may be deposited on the internal face of the ceramic tube 84. The sputtering coat may enable the ceramic tube 84 to be more resistant to high voltage punch-through (e.g., arcing). As such, the high voltage may be gradually increased after a sufficient coating is formed (e.g., after 100 hours).

Figure 18:
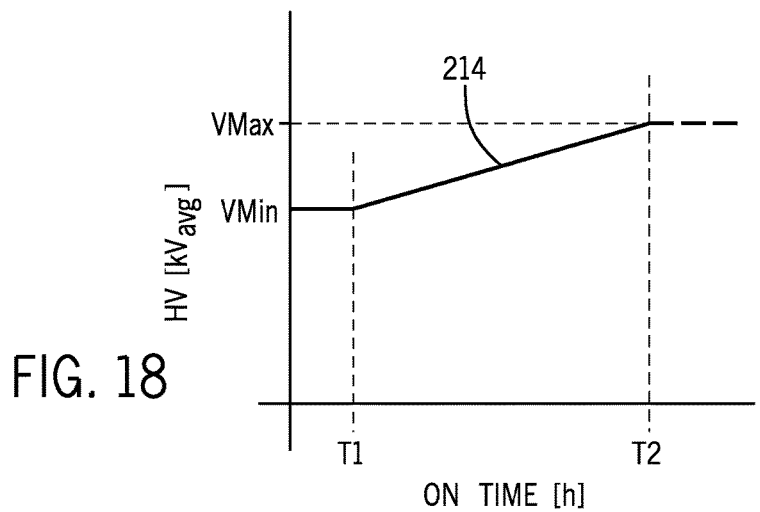
FIG. 18 is a plot of a rule/model describing a relationship Minitron on time (MOT) and high voltage setpoint in the neutron generator of FIG. 3B, in accordance with an embodiment of the present techniques.

Thus, one rule and/or model 174 may describe gradually increasing the high voltage supplied to the target 68 after an initial "break-in" period. An illustrative representation of this rule and/or model 174 is described in FIG. 18 using a high voltage on-time curve 214. In the depicted embodiment, the rule and/or model 174 instructs that the high voltage may be maintained at a minimum high voltage (e.g., 100 kV) from initial power-on to a first time (e.g. 0-100 hours) of radiation generator on-time. After the initial break-in period, the rule and/or model 174 instructs that the high voltage may be gradually (e.g., linearly) increased to a maximum voltage (e.g., 115 kV) from the first time to a second time (e.g., 100-1000 hours) of radiation generator on-time. Subsequently, the rule and/or model 174 instructs that the high voltage may be maintained at the maximum voltage.

Figure 19:
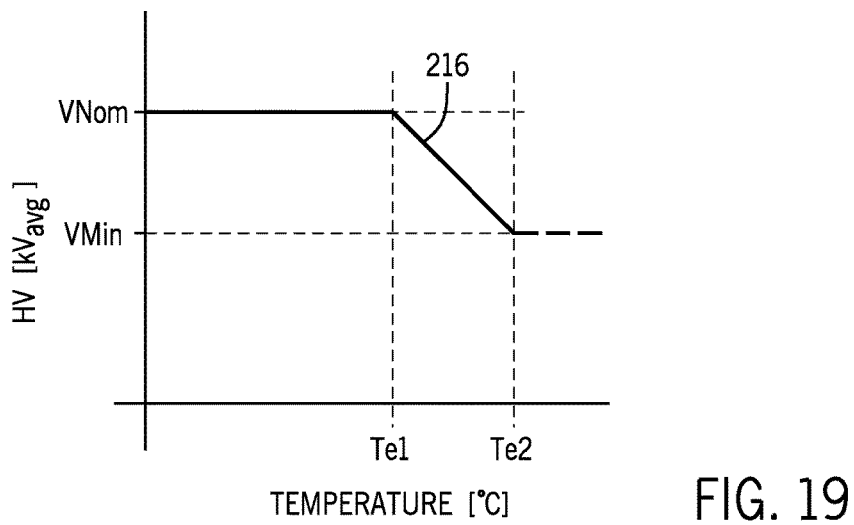
FIG. 19 is a plot of a rule/model describing a relationship between temperature and high voltage setpoint in the neutron generator of FIG. 3B, in accordance with an embodiment of the present techniques.

However, as described above, the magnitude of the high voltage supplied to the target 68 may also affect the desired objectives 170 and be subject to constraints 172. For example, increasing the high voltage may increase temperature of the neutron generator 39B, thereby decreasing the neutron output. Accordingly, a second rule and/or constraint may limit the magnitude of the high voltage based on temperature of the neutron generator 39B. An illustrative representation of this rule and/or model 174 is described in FIG. 19 using a high voltage temperature curve 216. In the depicted embodiment, the rule and/or model 174 instructs that the high voltage may be maintained at a nominal voltage (e.g., magnitude governed by other rules and/or models 174) until reaching a first temperature threshold (e.g., 155° C.). Once reaching the first temperature threshold, the rule and/or model 174 may instruct that the high voltage may be gradually (e.g., linearly) reduced to a minimum high voltage (e.g., 90 kV) when the temperature reaches a second temperature threshold. At higher temperatures, the rule and/or model 174 instructs that the high voltage may be maintained at the minimum high voltage.

Figure 20:
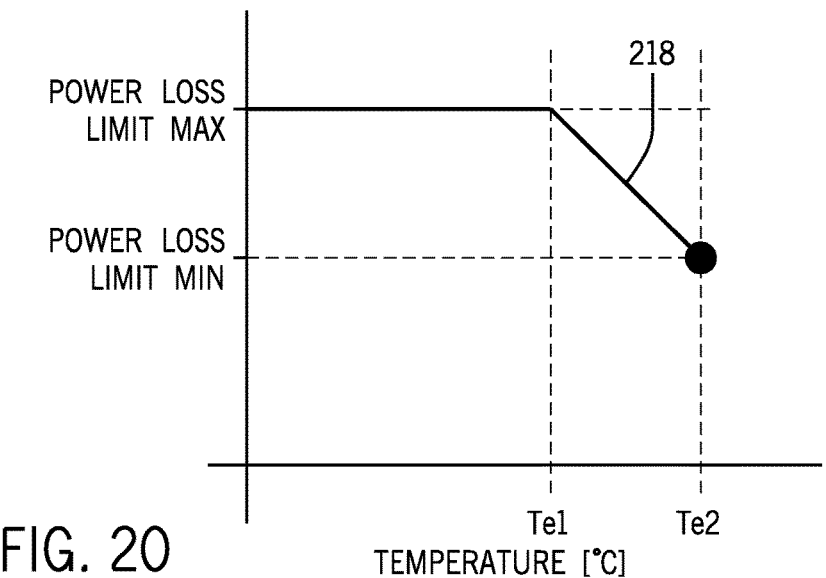
FIG. 20 is a plot of a rule/model describing a relationship between power loss limit and temperature in the high voltage power supply of FIG. 10, in accordance with an embodiment of the present techniques.

Additionally, as discussed above, an increase in temperature may also affect reliability of the electrical system (e.g., power loss and leakage current) and/or power constraints (e.g., total power consumption). Accordingly, a third rule and/or model 174 may limit the power loss in the high voltage source 72, and thus magnitude of the high voltage, based on temperature of the neutron generator 39B. An illustrative representation of this rule and/or model 174 is described in FIG. 20 using a power loss limit curve 218. In the depicted embodiment, the rule and/or model 174 instructs that the power loss limit may be maintained at a maximum value until reaching a first temperature threshold (e.g., 155° C.). Once reaching the first temperature threshold, the rule and/or model 174 may instruct that the power loss limit may be gradually (e.g., linearly) reduced to a minimum value when the temperature reaches a second temperature threshold (e.g., 175° C.). At higher temperatures, the rule and/or model 174 instructs that the high voltage may be maintained at the minimum power loss limit. Thus, since the power loss in the high voltage source 72 may depend on the magnitude of the output voltage, the high voltage, the beam current, and/or the neutron output may be adjusted so that the power loss is less than or equal to the power loss limit.

Figure 21:
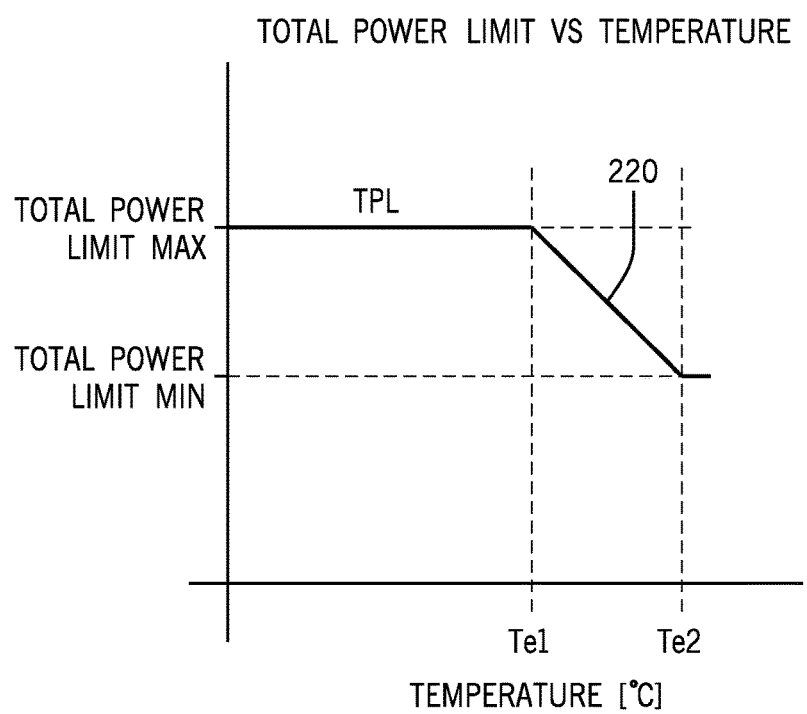
FIG. 21 is a plot of a rule/model describing a relationship between total power consumption limit and temperature in the neutron generator of FIG. 3B, in accordance with an embodiment of the present techniques.

Furthermore, a fourth rule and/or model 174 may limit the total power consumption by the neutron generator 39B, and thus magnitude of the high voltage as well as other parameters, based on temperature of the neutron generator 39B. An illustrative representation of this rule and/or model 174 is described in FIG. 21 using a total power consumption limit curve 220. In the depicted embodiment, the rule and/or model 174 instructs that the total power consumption limit may be maintained at a maximum value until reaching a first temperature threshold (e.g., 155° C.). Once reaching the first temperature threshold, the rule and/or model 174 may instruct that the total power loss limit may be gradually (e.g., linearly) reduced to a minimum value when the temperature reaches a second temperature threshold (e.g., 175° C.). At higher temperatures, the rule and/or model 174 instructs that the high voltage output may be maintained at the minimum total power consumption limit. As will be described in more detail below, the high voltage, the beam current, and/or the neutron output may be adjusted so that the total power consumption is less than or equal to the total power consumption limit. Thus, since the high voltage and the beam current consume electrical power, the high voltage, the beam current, and/or the neutron output may be adjusted so that the total power consumption is less than or equal to the total power consumption limit.

As can be appreciated, depending on the specific electronically operated radiation generator 39, other rules and/or models 174 may be generated to capture the various relationships between operational parameters, desired objectives, and constraints. For example, a fifth rule and/or model 174 may capture the inverse quadratic relationship between the beam current and the high voltage for constant neutron output (e.g., as described in FIG. 6). Additionally, a sixth rule and/or model 174 may capture the exponential relationship between the high voltage and leakage current (e.g., as described in FIG. 13). It should be appreciated that the described rules and/or models 174 are simplified; however, in other embodiments, the rules and/or models 174 may be more complex.

Figure 22:
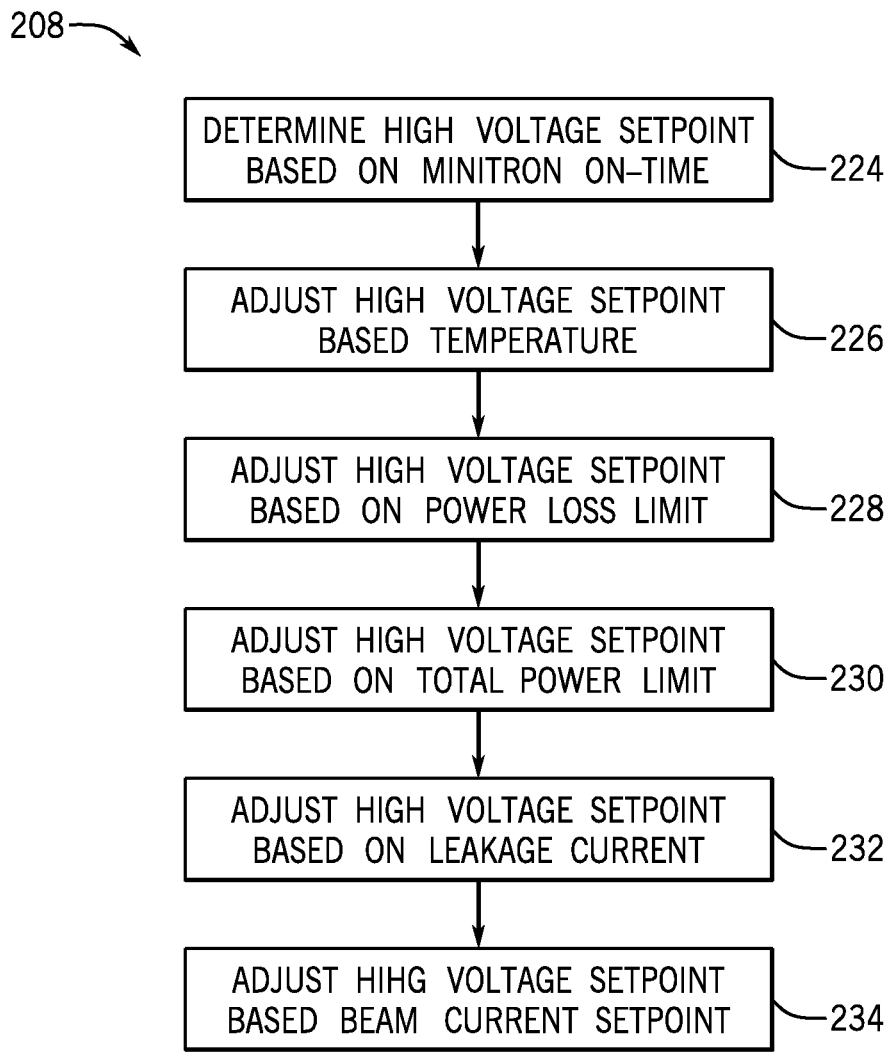
FIG. 22 is a process flow diagram for determining a high voltage setpoint, in accordance with an embodiment of the present techniques.

Based at least in part on the determined one or more rules and/or models 174, the control system 162 may determine the high voltage setpoint 198. One embodiment of a process 222 for determining the high voltage setpoint 198 is described in FIG. 22. Generally, the process 222 includes determining a high voltage setpoint based on radiation generator on-time (process block 224), adjusting the high voltage setpoint based on temperature (process block 226), adjusting the high voltage setpoint based on a power loss limit (process block 228), adjusting the high voltage setpoint based a total power consumption limit (process block 230), adjusting the high voltage setpoint based on leakage current (process block 232), and adjusting the high voltage setpoint based on beam current (process block 234). In some embodiments, process 222 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the high voltage setpoint 198 based on the radiation generator on-time (e.g., age) of the neutron generator 39B via the radiation generator on-time curve 190 (process block 224). In other embodiments, the control system 162 may include a clock or timer that measures the operational time of the neutron generator 39B. For example, the control system 162 may start a timer when the neutron generator 39B is on and stop the timer when the neutron generator 39B is off. As such, the control system 162 may determine the radiation generator on-time based at last in part on the count value of the time.

Additionally, the relationship between the high voltage and radiation generator on-time may be based at least in part on a type of the neutron generator 39B (e.g., a standard design or an enhanced high voltage design). In some embodiments, the control system 162 may determine the type by polling the neutron generator 39B, for example during startup, or based on an operator indication. Based on the type, the control system 162 may identify the appropriate rule and/or model 174 (e.g., FIG. 18) and input the determined radiation generator on-time, thereby determining an initial high voltage setpoint. For example, when the radiation generator on-time is 100 hours, the control system 162 may determine that the initial high voltage setpoint is 100 kV.

The control system 162 may then adjust the high voltage setpoint based on temperature (process block 226). In some embodiments, the control system 162 may poll one or more temperature sensors positioned in the neutron generator 39B to determine the temperature. The control system may then input the determined temperature into the rule and/or model 174 (e.g., FIG. 19) to determine a correction applied to the high voltage setpoint. More specifically, the determined correction may be additively applied to a previously determine high voltage setpoint. To help illustrate, continuing with the above example, when the temperature is 175° C., the control system 162 may apply a −10 kV correction to the 100 kV setpoint, thereby determining a high voltage setpoint of 90 kV.

Figure 23:
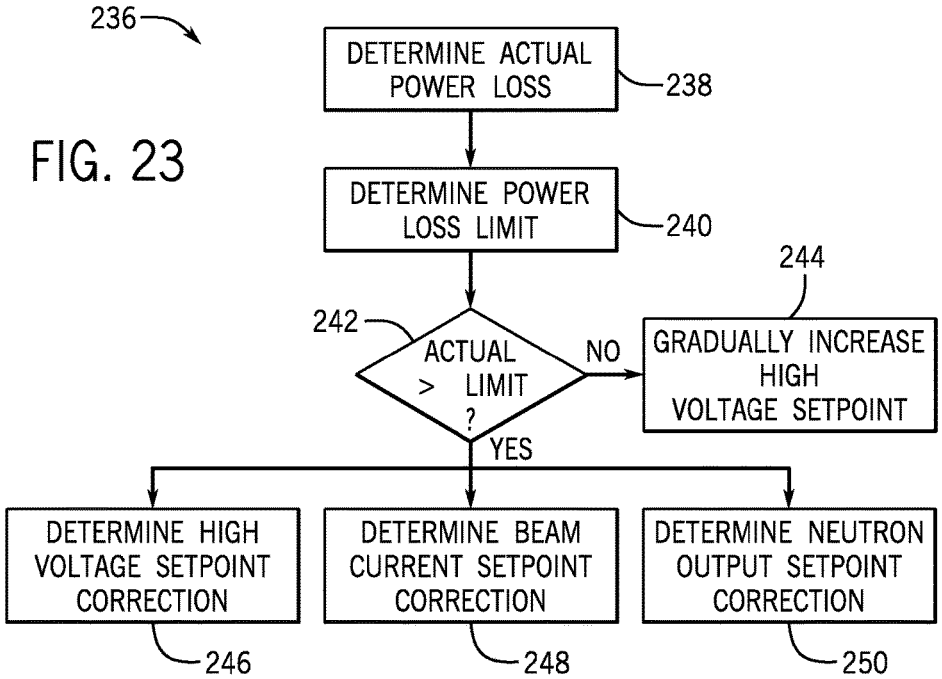
FIG. 23 is a process flow diagram for adjusting high voltage setpoint, beam current setpoint, and neutron output setpoint based on the power loss limit, in accordance with an embodiment of the present techniques.

Subsequently, the control system 162 may adjust the high voltage setpoint based on a power loss limit (process block 228). To help illustrate, one embodiment of a process 236 for adjusting operational parameters based on the power loss limit is described in FIG. 23. Generally, the process 236 includes determining actual power loss (process block 238), determining a power loss limit (process block 240), determining whether the actual power loss is greater than the power loss limit (decision block 242), and gradually increasing the high voltage setpoint when not greater than the power loss limit (process block 244). Additionally, the process 236 includes determining a high voltage setpoint correction (process block 246), a beam current setpoint correction (process block 248), and a neutron output setpoint correction (process block 250) when the actual power loss is greater than the power loss limit. In some embodiment, process 236 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the actual power loss of the high voltage power supply 72 based at least in part on the power loss monitor 182 (process block 238). As described above, the power loss may be caused by inefficiencies in the components (e.g., capacitors 132 and/or diodes 134) in the high voltage power supply 72. Thus, in some embodiments, the power loss may be determined based at least in part the difference between the electrical power input to the high voltage power source 72 and the electrical power output from the high voltage power source 72. For example, the power loss may be calculated as follows:

$$PL = (BV * IC) - HV * BC \tag{1}$$

where PL is the actual power loss, BV is the bus voltage (e.g., input voltage 136), IC is input current to the high voltage power supply 72, HV is the high voltage (e.g., output voltage 138), and BC is the beam current 186. Thus, one or more current and voltage sensors may be used to determine the bus voltage, the input current, the high voltage, and the beam current.

Additionally, the control system 162 may determine the power loss limit based at least in part on temperature and a rule and/or model 174 (process block 240). More specifically, the control system 162 may input the determined temperature 176 into a rule and/or model 174 (e.g., FIG. 20) that describes a relationship between temperature and the power loss limit.

The control system 162 may then determine whether the actual power loss is greater than the power loss limit (decision block 242). More specifically, this may enable the control system 162 to determine whether the actual power loss is greater than desired. As such, when the actual power loss is not greater than the power loss limit, the control system 162 may gradually increase the high voltage setpoint toward the ceiling (process block 244).

As described above, the magnitude of the power loss may be based at least in part on the high voltage supplied to the target 68. As such, when the actual power loss is greater than the power loss limit, the control system 162 may reduce the high voltage setpoint to reduce the power loss below the power loss limit (process block 246). However, reducing the high voltage may also affect the other operational parameters, such as neutron output. Accordingly, to compensate, the control system 162 may also determine a beam current setpoint correction (process block 248) and/or determine a neutron output setpoint correction (process block 250).

Figure 24:
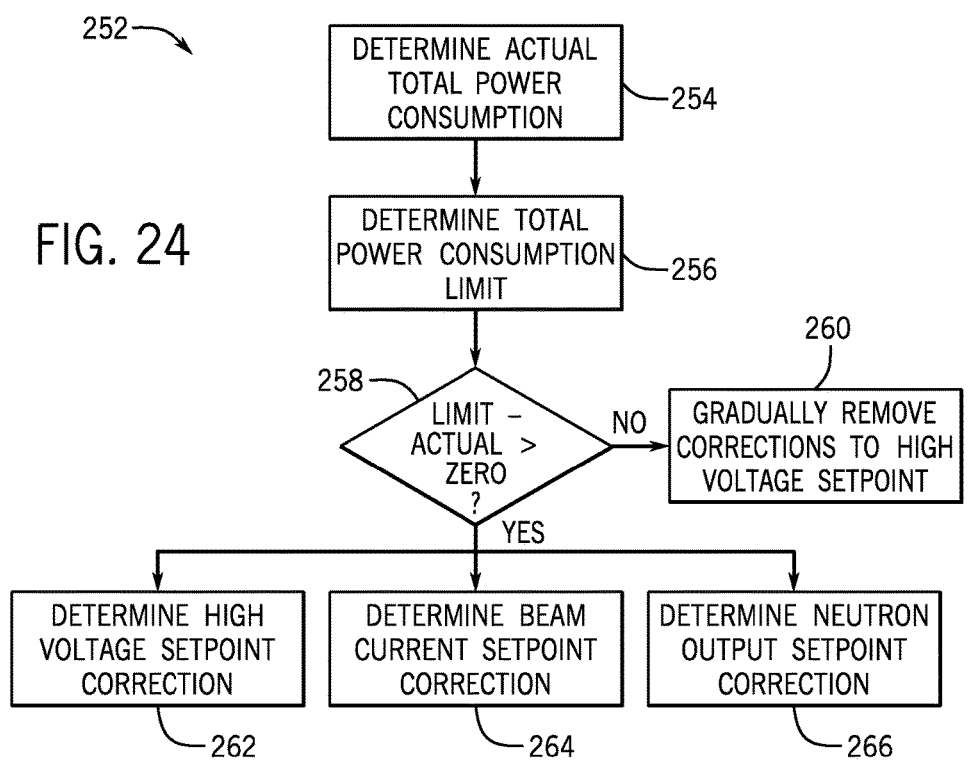
FIG. 24 is a process flow diagram for adjusting high voltage setpoint, beam current setpoint, and neutron output setpoint based on the total power consumption limit, in accordance with an embodiment of the present techniques.

Returning to FIG. 22, the control system 162 may then may adjust the high voltage setpoint based on a total power consumption limit (process block 230). To help illustrate, one embodiment of a process 236 for adjusting operational parameters based on the total power consumption is described in FIG. 24. Generally, the process 252 includes determining actual total power consumption (process bloc 254), determining a total power consumption limit (process block 256), determining whether the actual total power consumption is greater than the total power consumption limit (decision block 258), and gradually removing corrections to the setpoints when the actual total power consumption is not greater than the total power consumption limit (process block 260). Additionally, the process 252 includes determining a high voltage setpoint correction (process block 246), a beam current setpoint correction (process block 248), and a neutron output setpoint correction (process block 250) when the actual total power consumption is greater than the total power consumption limit. In some embodiment, process 252 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the actual total power consumption based at least in part on the total power consumption monitor 182 (process block 254). As described above, the total power consumption may be a summation of power usage by various components in the neutron generator 39B. For example, in the neutron generator 39B described above, the power consumption may include power consumption by the extractor electrode 98, the anode (e.g., grid) 96, the cathode 76, the filament 91, and the target 68. As such, the total power consumption may be determined based on the power output by the gas reservoir power supply 102, the cathode power supply 80, the ionizer power supply 100, and the high voltage power supply 72. Accordingly, the total power consumption may be calculated as follows:

$$TP=(BV*GC)+(BV*IC)+(BV*CC)+(BV*FC) \qquad (2)$$

where TP is the actual total power consumption, BV is the bus voltage (e.g., input voltage 136), GC is the input current 190 supplied from the ionizer power supply 100, IC is the input current to the high voltage power supply 72, CC is the input current supplied to the cathode power supply 80, and FC is the input current supplied to the filament power supply 102. Thus, one or more current and voltage sensors may be used to determine the bus voltage, the input current, the high voltage, the grid current, the cathode current, and the filament current.

Additionally, the control system 162 may determine the total power consumption limit based at least in part on temperature and a rule and/or model 174 (process block 256). More specifically, the control system 162 may input the determined temperature 176 into a rule and/or model 174 (e.g., FIG. 21) that describes a relationship between temperature and the total power consumption limit.

The control system 162 may then determine whether the actual total power consumption is greater than the total power consumption limit (decision block 258). More specifically, this may enable the control system 162 to determine whether the actual power consumption is greater than desired. As such, when the actual total power consumption is not greater than the power loss limit, the control system 162 may gradually remove corrections to the setpoints (process block 260).

On the other hand, when the actual total power consumption is greater than the total power consumption limit, the control system 162 may reduce power consumption by one or more components in the neutron generator 39B. As described above, the power consumption may be reduced by reducing the high voltage output by the high voltage power supply 72. Accordingly, the control system 162 may determine a correction to the high voltage setpoint (process block 262). Additionally, the power consumption may be reduced by reducing the power supplied to the filament 91, thereby decreasing the beam current. Accordingly, the control system 162 may determine a correction to the beam current setpoint (process block 264). Furthermore, since adjusting the beam current and the high voltage may affect the neutron output, the control system 162 may also determine a neutron output setpoint correction (process block 266).

Moreover, since the total power consumption may be used to adjust at least three operational parameter setpoints, there may be a number of different sets of adjustments that can be made to reduce the total power consumption below the total power consumption limit. Accordingly, as will be described in more detail below, the adjustment to the operational parameters may also be tied in with the other desired objectives 170 and/or constraints 172. For example, when reliability is less important than neutron output, the high voltage setpoint may be increased to maintain the neutron output setpoint while the beam current is decreased to reduce total power consumption. On the other hand, when reliability is more important than neutron output, the neutron output setpoint may be reduced, while the high voltage setpoint is lowered to reduce total power consumption.

Returning to FIG. 22, the control system 162 may then adjust the high voltage setpoint based on leakage current (process block 232). Generally, a leakage current includes current that is supplied to the neutron generator 39B, but not used to ionize the hydrogen isotopes. As such, leakage current may consume electrical power without contributing to neutron output. However, detecting and handling leakage current may be difficult. Accordingly, processes may be developed to determine (e.g., estimate) the leakage current.

Figure 25:
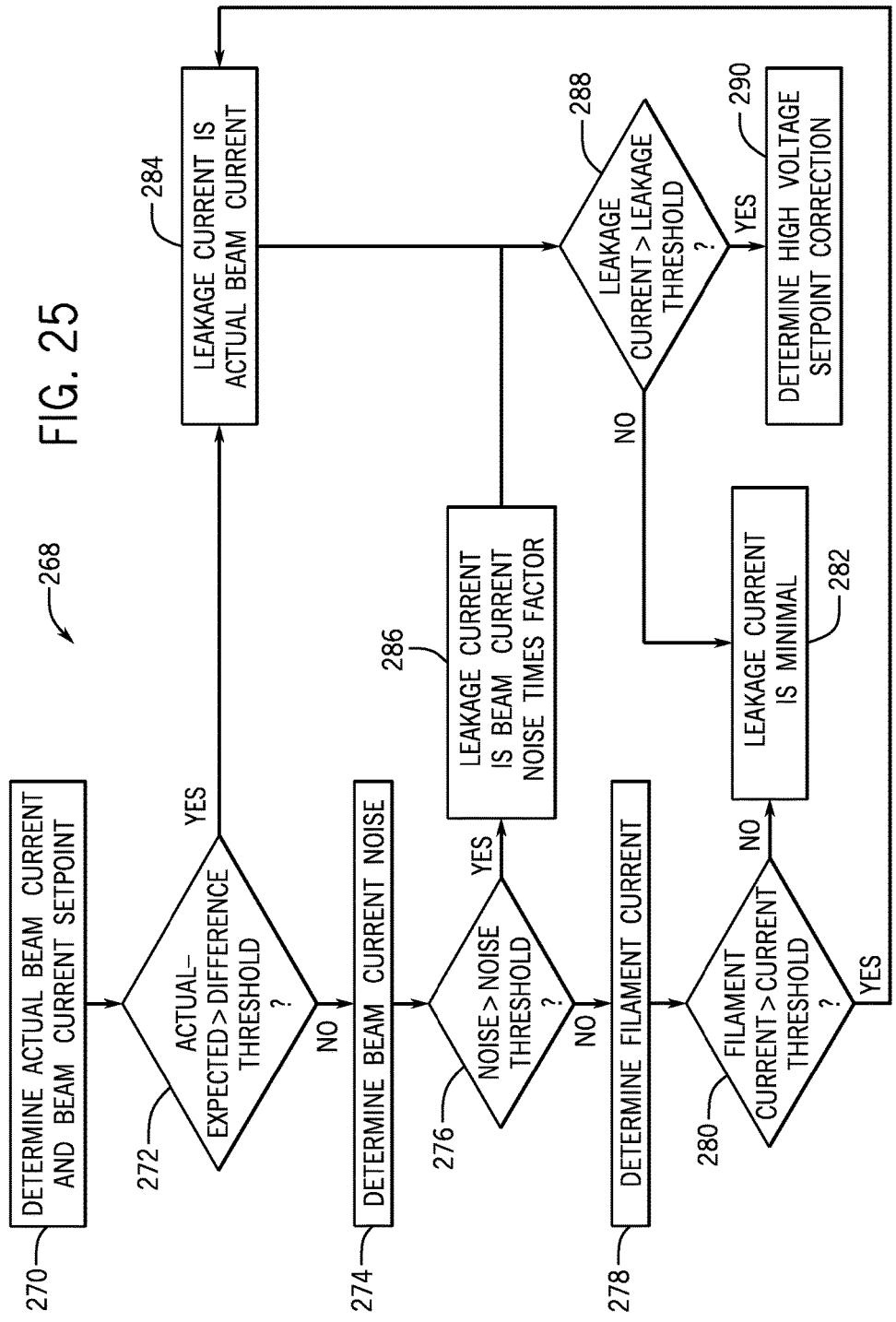
FIG. 25 is a process flow diagram for determining leakage current and adjusting high voltage setpoint based on the leakage current, in accordance with an embodiment of the present techniques.

To help illustrate, one embodiment of a process 268 for determining leakage current and determining an appropriate high voltage setpoint correction is described in FIG. 25. Generally, the process 268 includes determining actual beam current and a beam current setpoint (process block 270), determining whether difference between the actual beam current and the beam current setpoint is greater than a difference threshold (decision block 272), determining beam current noise when the difference is not greater than the difference threshold (process block 274), determining whether the beam current noise is greater than a noise threshold (decision block 276), determining filament current when the noise is not greater than the noise threshold (process block 278), determining whether the filament current is less than a current threshold (decision block 280), and determining that leakage current is minimal when the filament current is not less than the current threshold (process block 282).

Additionally, the process 268 includes determining that the leakage current is equivalent to the actual beam current when the difference between the actual beam current and the beam current setpoint is greater than the threshold or when the filament current is greater than the current threshold (process block 284) and determining the leakage current based at least in part on the beam current noise when the beam current noise is greater than the noise threshold (process block 286). Furthermore, the process 268 includes determining whether the leakage current is greater than a leakage threshold (decision block 288), determining a high voltage setpoint correction when the leakage current is greater than the leakage threshold (process block 290), and determining that the leakage current is minimal when the leakage current is not greater than the leakage threshold (process block 282). In some embodiment, process 268 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the actual beam current, for example from the beam current monitor 188, and a previous beam current setpoint (process block 270). In some embodiments, based on the previous beam current setpoint, the control system 162 may determine an expected value of the beam current because the beam current may be gradually adjusted to reduce the likelihood of overshoot. Additionally, in some embodiments, each determined operational parameter setpoint 168 may be stored in memory 165. Accordingly, the control system 162 may determine the previous beam current setpoint from memory 165.

The control system 162 may then determine whether the difference between the actual beam current and the expected current setpoint is greater than a difference threshold (decision block 272). In other words, the control system 162 may determine whether magnitude of the actual beam current is as expected. Since the operational parameters of the neutron generator 39B are controlled such that the actual beam current should be approximately equal to the beam current setpoint, a deviation is likely the result of leakage current. As a result, the control system 162 may determine that the magnitude of the leakage current is approximately equal to the actual beam current (process block 274).

Additionally, the control system 162 may determine the beam current noise using various techniques, such as standard deviation, max-min, noise energy calculations, and the like. In some embodiments, the beam current noise may be determined based on difference between successive deviation determinations (e.g., difference between actual beam current and expected beam current) (process block 274). For example, the calculation of the beam current noise may be as follows:

$$BCN = |(ABC_i - EBC_i) - (ABC_{i-1} - EBC_{i-1})| \qquad (3)$$

where BCN is the beam current noise, $ABC_i$ is the actual beam current at time i, $EBC_i$ is the expected beam current at time i, $ABC_{i-1}$ is the actual beam current at time i−1, and $EBC_{i-1}$ is the expected beam current at time i−1. In some embodiments, the beam current noise may be filtered to reduce the likelihood of falsely detecting a leakage current.

The control system 162 may then determine whether the beam current noise is greater than the noise threshold (process block 276). More specifically, since the leakage current generally is uncontrolled, unstable, and somewhat random, a beam current noise greater than the noise threshold may indicate the presence of leakage current. As can be appreciated, the specific value of the noise threshold may be based on implementation and/or empirical testing.

As such, when the control system 162 determines that leakage current is likely present based on beam current noise, the control system 162 may determine that the leakage current is equal to the beam current noise times a scaling factor (process block 286). In some embodiments, the scaling factor may range from 0-50, and is typically empirically determined.

Furthermore, the control system 162 may determine the filament current based on a current sensor coupled to the filament 91 (process block 278). The control system 162 may then compare the filament current to a current threshold (decision block 280). More specifically, when the filament current is below the current threshold, the electrical power supplied to the ion source 66 may be insufficient to produce ions. As such, when the filament current is below the current threshold, the control system 162 may determine that the leakage current is approximately equal to the actual beam current (process block 284).

Once the leakage current is determined, the control system 162 may determine whether the leakage current is greater than the leakage threshold (process block 288). As described above (e.g., in FIG. 13), some amount of leakage current is to be expected. Thus, when the leakage current is not greater than the leakage threshold, the control system 162 may determine that the leakage current is minimal (process block 282), and thus, not adjust the high voltage setpoint based on leakage current.

However, as the leakage current increases, the operational efficiency of the neutron generator 39B decreases. Thus, when the leakage current is greater than the leakage threshold, the control system 162 may determine a correction to the high voltage setpoint (process block 290). More specifically, since the leakage current varies exponentially in relation to the high voltage, even a small correction to the high voltage setpoint may greatly reduce the leakage current.

Returning to FIG. 22, the control system 162 may then adjust the high voltage setpoint based on the beam current setpoint (process block 234). As described above, the high voltage and/or the beam current may affect various desired objectives 170 (e.g., desired neutron output) and constraints (e.g., total power consumption). To control the desired output, adjustment of the beam current may be prioritized over adjustments to the high voltage. In other words, to increase neutron output, the beam current may be increased before making an adjustment to the high voltage. Similarly, to decrease the neutron output, the beam current may be decreased before making an adjustment to the high voltage.

Figure 26:
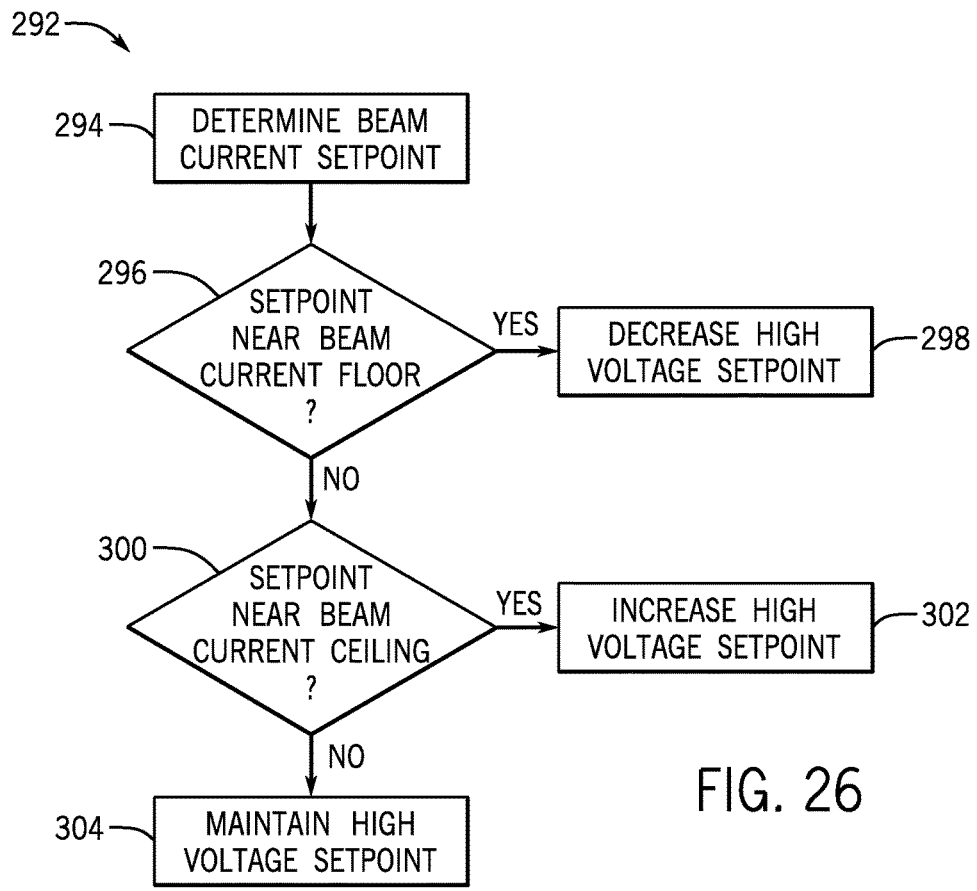
FIG. 26 is a process flow diagram for adjusting high voltage setpoint based on the beam current setpoint, in accordance with an embodiment of the present techniques.

Accordingly, the high voltage setpoint may be adjusted based on the beam current setpoint. To help illustrate, one embodiment of a process 292 for adjusting the high voltage setpoint based on the beam current setpoint is described in FIG. 26. Generally, the process 292 includes determining a beam current setpoint (process block 294), determining whether the beam current setpoint is near a beam current floor (decision block 296), and decreasing the high voltage setpoint when the beam current setpoint is near the beam current floor (process block 298). Additionally, the process 292 includes determining whether the beam current setpoint is near a beam current ceiling (decision block 300), increasing the high voltage setpoint when the beam current setpoint is near the beam current ceiling (process block 302), and maintaining the high voltage setpoint when the beam current is not near the beam current ceiling (process block 304). In some embodiment, process 292 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the beam current setpoint, as will be described in more detail below (process block 294). The control system 162 may then determine whether the beam current setpoint is near the beam current floor (e.g., a lower limit) (decision block 296). More specifically, when the beam current setpoint is near the floor, the ability of the control system 162 to adjust neutron output may be hindered. For example, when the beam current setpoint is near the floor and it is desirable to reduce neutron output, the control system 162 may be unable to sufficiently reduce the beam current to reduce the neutron output. As such, the control system 162 may reduce the high voltage setpoint to increase the ability to control the neutron output using the beam current (process block 298).

Additionally, the control system 162 may determine whether the beam current setpoint is near the beam current ceiling (e.g., an upper limit) (decision block 300). More specifically, when the beam current setpoint is near the ceiling, the ability adjust neutron output may be hindered. For example, when the beam current is near the ceiling and it is desirable to increase neutron output, the control system 162 may be unable to sufficiently increase the beam current to increase the neutron output. As such, the control system 162 may increase the high voltage set point to increase the ability to control the neutron output using the beam current (process block 302).

Figure 27:
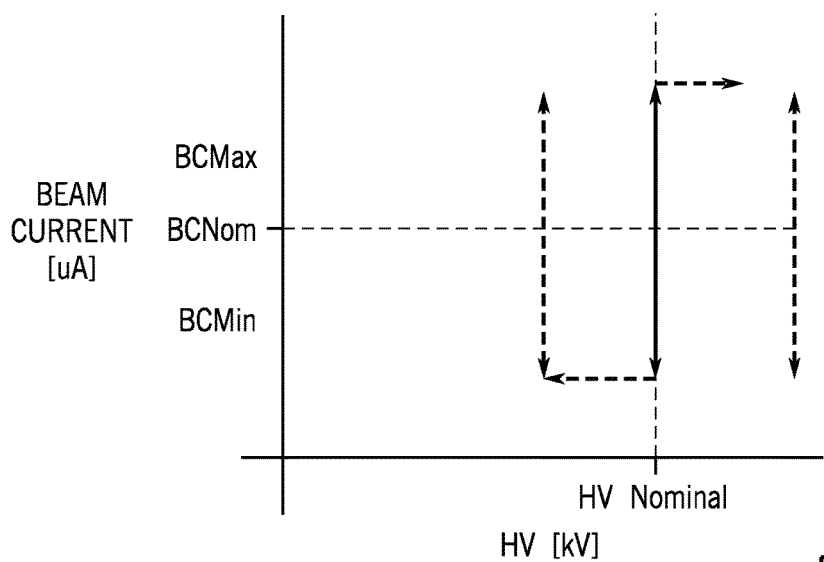
FIG. 27 is a plot describing adjustments to the high voltage setpoint based on the beam current setpoint, in accordance with an embodiment of the present techniques.

To help illustrate the adjustment of the high voltage setpoint, a plot describing example changes to the high voltage setpoint is described in FIG. 27. In the depicted embodiment, the high voltage setpoint may initially be set at a nominal high voltage setpoint (e.g., 5 kV). As such, the beam current setpoint may be adjusted between a minimum value (e.g., 20 uA) and a maximum value (e.g., 120 uA) to adjust neutron output. However, when the beam current setpoint nears the minimum value, the high voltage setpoint may be reduced. Since the high voltage is reduced, the beam current may be increased while maintaining approximately the same neutron output. Similarly, when the beam current setpoint nears the maximum value, the high voltage setpoint may be increased. Since the high voltage is increased, the beam current may be decreased while maintaining approximately the same neutron output. Furthermore, when the initial high voltage setpoint is adjusted, the high voltage setpoint may be returned to the initial high voltage setpoint upon being sufficiently far (e.g., 70 uA) from the floor and the ceiling. In this manner, a larger portion of the beam current range (e.g., 20-120 uA) may be utilized to adjust the neutron output.

Based on the above described example, the high voltage setpoint 198 may be determined to account for the relationship with other operational parameters, the desired objectives 170, and the constraints 172. It should be appreciated that the corrections to the high voltage setpoint 198 may be performed in any order.

Determining Neutron Output Setpoint

To further illustrate, the techniques described herein will be described in relation to the neutron output setpoint. As described above, the neutron output may be primarily based on temperature. More specifically, the neutron output may be controlled by the high voltage supplied to the target 68 and the beam current. However, as the temperature increases, the reliability of the high voltage power supply 72 and/or the electrical insulation system may decrease. As such, to maintain reliability, the neutron output setpoint may be reduced to enable the high voltage setpoint and/or the beam current setpoint to be reduced.

Figure 28:
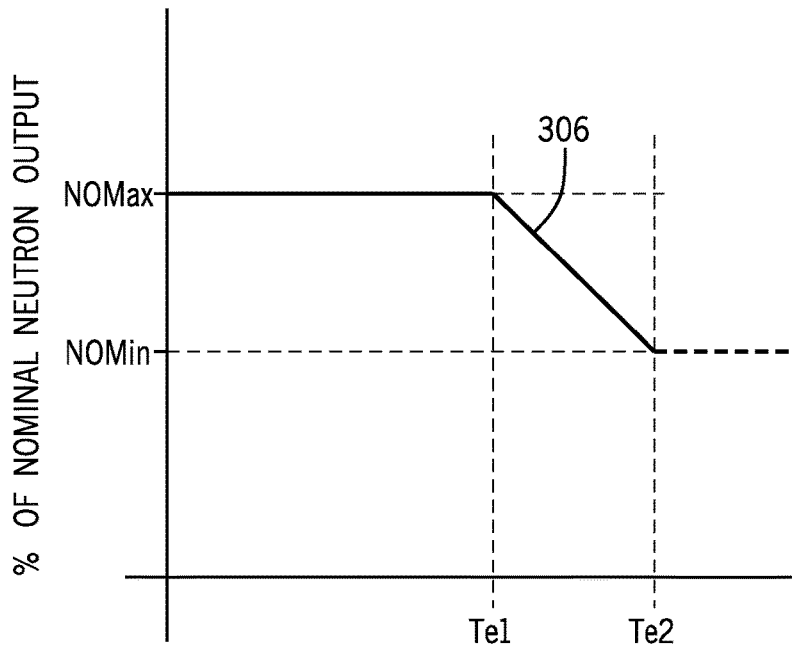
FIG. 28 is a plot of a rule/model describing a relationship between neutron output and temperature in the neutron generator of FIG. 3B, in accordance with an embodiment of the present techniques.

Thus, one rule and/or model 174 may describe gradually decreasing the neutron output setpoint once a threshold temperature is reached. An illustrative representation of this rule and/or model 174 is described in FIG. 28 using a neutron output temperature curve 306. In the depicted embodiment, the rule and/or model 174 instructs that the neutron output setpoint may be maintained at a maximum value (e.g., 100%) until reaching a first temperature threshold (e.g., 155° C.). Once reaching the first temperature threshold, the rule and/or model 174 may instruct that the neutron output be gradually (e.g., linearly) reduced to a minimum value (e.g., 70%) when the temperature reaches a second temperature threshold (e.g., 175° C.). At higher temperatures, the rule and/or model 174 instructs that the neutron output setpoint be maintained at the minimum neutron output.

Figure 29:
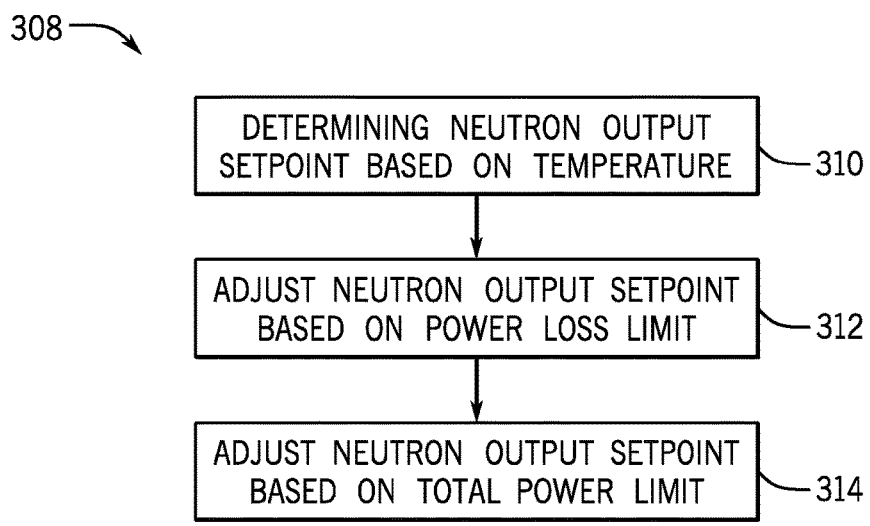
FIG. 29 is a process flow diagram for determining a neutron output setpoint, in accordance with an embodiment of the present techniques.

Based at least in part on the determined one or more rules and/or models 174, the control system 162 may determine the neutron output setpoint 196. One embodiment of a process 308 for determining the neutron output setpoint 196 is described in FIG. 29. Generally, the process 308 includes determining a neutron output setpoint based on temperature (process block 310), adjusting the neutron output setpoint based on a power loss limit (process block 312), and adjusting the neutron output setpoint based on a total power consumption limit (process block 314). In some embodiment, process 308 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the neutron output setpoint based on temperature (process block 308). In some embodiments, the control system 162 may poll one or more temperature sensors positioned in the neutron generator 39B to determine the temperature. The control system 162 may then input the determined temperature into the rule and/or model 174 (e.g., FIG. 28), thereby determining an initial the neutron output setpoint. For example, when the temperature of the neutron generator 39B is 155° C., the control system 162 may determine that the initial neutron output setpoint is 100%.

As described above (e.g., FIGS. 23 and 24), the control system 162 may adjust the initial neutron output setpoint based on the power loss limit (process block 312) and based on the total power consumption limit (process block 314). More specifically, the neutron output setpoint may be reduced to enable the high voltage setpoint and/or the beam current setpoint to be reduced. In this manner, the power loss and the total power consumption of the neutron generator 39B may also be reduced. However, the specific amount of adjustments may be based on trade-offs between the importance of the neutron output setpoint, reliability, useful life, and the flexibility of the constraints. For example, if the total power consumption is a hard constraint (e.g., finite amount of power) the neutron output setpoint may be reduced even when the neutron output is important.

Based on the above described example, the neutron output setpoint 196 may be determined to account for the relationship with other operational parameters, the desired objectives 170, and the constraints 172. It should be appreciated that the corrections to the neutron output setpoint 196 may be performed in any order.

Determining Beam Current Setpoint

To further illustrate, the techniques described herein will be described in relation to the beam current setpoint 200. As described above, the beam current may be prioritized to adjust the neutron output of the neutron generator. More specifically, the neutron output may vary relatively linearly with the beam current. Thus, one rule and/or model 174 may describe the beam current 200 to achieve a desired neutron output. For example, the rule and/or model 174 may describe adjusting the beam current setpoint 200 proportionally to a desired adjustment in neutron output.

Figure 30:
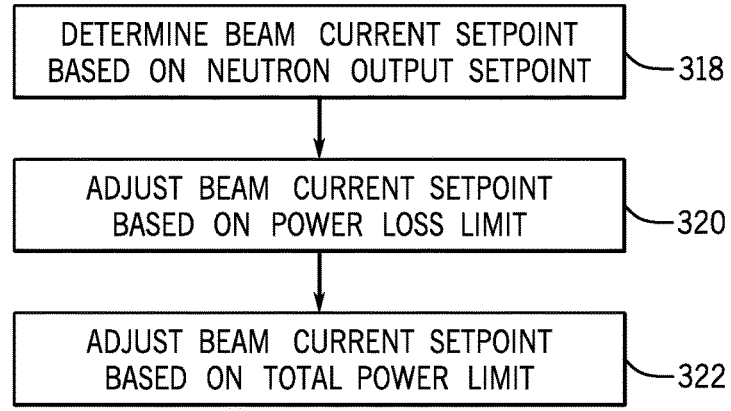
FIG. 30 is a process flow diagram for determining beam current setpoint, in accordance with an embodiment of the present techniques.

Based at least in part on the determined one or more rules and/or models 174, the control system 162 may determine the beam current setpoint 200. One embodiment of a process 316 for determining the beam current 200 setpoint is described in FIG. 30. Generally, the process 316 includes determining a beam current setpoint based on a neutron output setpoint (process block 318), adjusting the beam current setpoint based on a power loss limit (process block 320), and adjusting the beam current setpoint based on a total power consumption limit (process block 322). In some embodiment, process 308 may be implemented by instructions stored on a tangible, non-transitory, computer-readable medium, such as memory 42, 48, or 64, executed by the processing circuitry 164, such as processor 40, 46, or 62.

Figure 31:
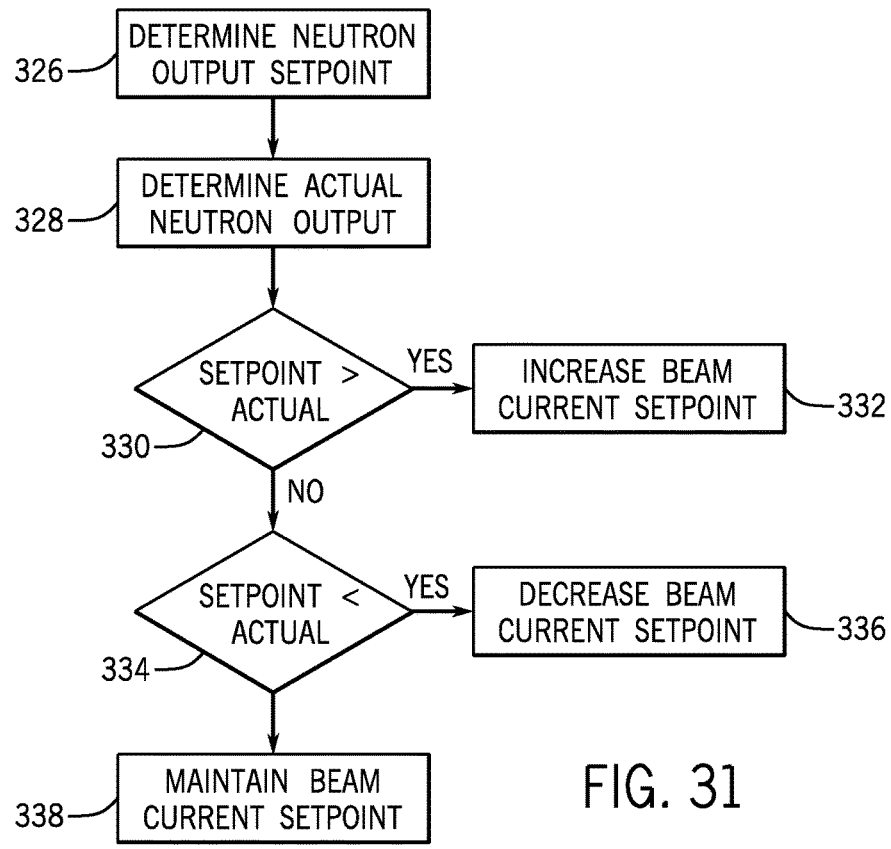
FIG. 31 is a process flow diagram for adjusting beam current setpoint based on a neutron output setpoint, in accordance with an embodiment of the present techniques.

Accordingly, the control system 162 may determine the beam current setpoint based on the neutron output setpoint (process block 318). To help illustrate, one embodiment of a process 324 for determining the beam current setpoint based on the neutron output setpoint is described in FIG. 31. Generally, the process 324 includes determining a neutron output setpoint (process block 326), determining an actual neutron output (process block 328), determining whether the neutron output setpoint is greater than the actual neutron output (decision block 330), and increasing the beam current setpoint when the neutron output setpoint is greater than the actual neutron output (process block 332). Additionally, the process 324 includes determining whether the setpoint is less than the actual neutron output (decision block 334), decreasing the beam current setpoint when the neutron output setpoint is less than the actual neutron output (process block 336), and maintaining the beam current setpoint when the setpoint is not less than the actual neutron output (process block 338). In some embodiment, process 316 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the neutron output setpoint in the manner described above (process block 326). As such, this further illustrates the causal relationship between the various operational parameter setpoints 168. In other words, determining the operation parameter 168 may include solving a nonlinear optimization problem.

Additionally, the control system 162 may determine the actual neutron output (process block 328). In some embodiments, the control system 162 may determine the actual neutron output using a neutron output monitor. However, in other embodiments, the neutron generator 39B may not include a neutron output monitor or the neutron output monitor may be faulty (e.g., saturated). In such instances, the control system 162 may infer the actual neutron output based at least in part on the input parameters 166.

Figure 32:
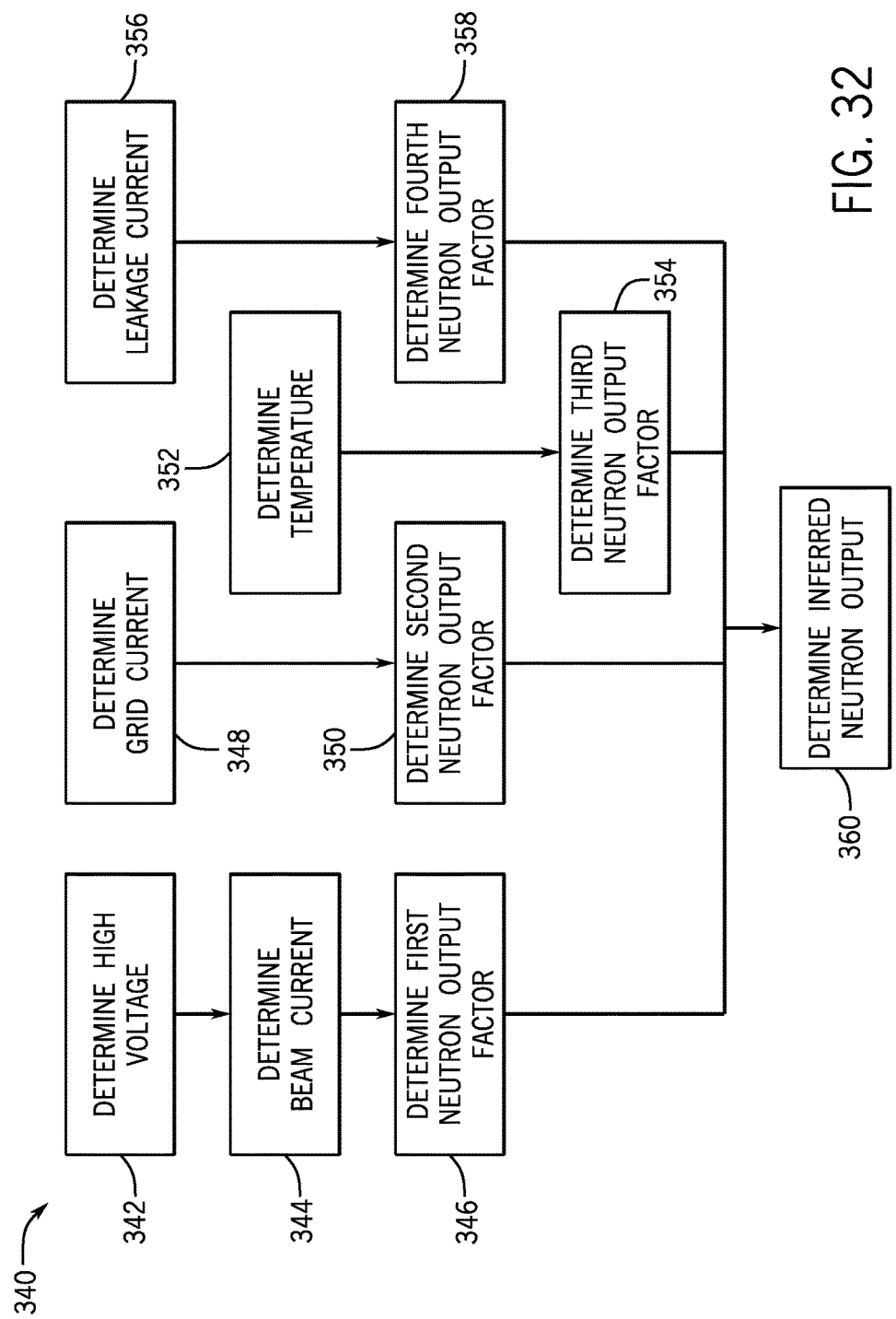
FIG. 32 is a process flow diagram for determining an inferred neutron output, in accordance with an embodiment of the present techniques.

To help illustrate, one embodiment of a process 340 for inferring the neutron output is described in FIG. 32. Generally, the process 340 includes determining the high voltage (process block 342), determining the beam current (process block 344), determining a first neutron output factor (process block 346), determining grid current (process block 348), determining a second neutron output factor (process block 350), determining temperature of the neutron generator (process block 352), determining a third neutron output factor (process block 354), determining leakage current (process block 356), determining a fourth neutron output factor (process block 358), and determining the inferred neutron output based on the first, second, third, and fourth neutron output factors (process block 360). In some embodiment, process 340 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the high voltage via the high voltage monitor 184 (process block 342) and determine the current beam via the current beam monitor 186 (process block 344). Based on the high voltage and the beam current, the control system 162 may determine a first neutron output factor (process block 346). One embodiment of a calculation that may be performed to determine the first neutron output factor is as follows:

$$\text{FiF} = (HV-35)^2 * CB/360000 \qquad (4)$$

where FiF is the first neutron output factor, HV is the high voltage, CB is the current beam, and 360000 is a scaling coefficient.

Additionally, the control system 162 may determine the grid current via the grid current monitor 188 (process block 348). Based on the grid current, the control system 162 may determine a second neutron output factor (process block 350) to account for grid current effects on neutron output. One embodiment of a calculation that may be performed to determine the second neutron output factor is as follows:

$$SF = \left(\frac{GC}{BC}\right) * \frac{1}{N} + (N-1)/N \qquad (5)$$

where SF is the second neutron output factor, GC is the grid current, BC is the beam current, and N is a tuning parameter. In some embodiments, N may be equal to 4.

Furthermore, the control system 162 may determine the temperature of the neutron generator 39B via the temperature monitor 176 (process block 352). Based on the temperature, the control system 162 may determine a third neutron output factor (process block 354). One embodiment of a calculation that may be used to determine the third neutron output factor is as follows:

$$TF = -\frac{e}{50} * T + (1-e) - \frac{-e}{50} * 175 \quad (6)$$

where TF is the third neutron output factor, T is the temperature, and e is a percent drop over a temperature range divided by 100. For example, when neutron output is linearly reduced from 100% at 125° C. to 95% at 175° C., e may be equal to 0.05.

The control system 162 may also determine the leakage current using the techniques described above (e.g., FIG. 25) (process block 356). Based on the leakage current, the control system 162 may determine a fourth neutron output factor (process block 358). One embodiment of a calculation that may be used to determine the fourth neutron output factor is as follows:

FoF=(CB−LC)/CB  (7)

where FoF is the fourth neutron output factor, CB is the current beam, and LC is the leakage current.

Based on the neutron output factors, the control system 162 may then infer the neutron output (process block 360). One embodiment of a calculation that may be used to determine the inferred neutron output is as follows:

NO=$K$*FiF*SF*TF*FoF  (8)

where NO is the inferred neutron output, FiF is the first neutron output factor, SF is the second neutron output factor, TF is the third neutron output factor, FoF is the fourth neutron output factor, and K is a tuning parameter. In some embodiments, the control system 162 may filter the inferred neutron output.

Moreover, in some embodiments, the K tuning parameter may be calibrated based on the spectroscopy detector count 192 in a known calibration environment. When calibration is enabled, one embodiment of a calculation that may be used to determine the K tuning parameter is as follows:

$$K = 36 \text{ when } NO < 0.1; \text{ otherwise}$$
$$K = SD * \frac{300}{S * NOF}$$

where SD is the filtered spectroscopy detector count, S is a scaling coefficient, and NOF is the filtered inferred neutron output.

Returning to FIG. 31, the control system 162 may then compare the neutron output setpoint with the actual (e.g., inferred) neutron output (process blocks 330 and 334). When the setpoint is greater, the control system 162 may increase the beam current setpoint (process block 332), thereby increasing the actual neutron output toward the neutron output setpoint. On the other hand, when the setpoint is lower, the control system may decrease the beam current setpoint (process block 336), thereby decreasing the actual neutron output toward the neutron output setpoint.

Returning to FIG. 30, as described above (e.g., FIGS. 23 and 24), the control system 162 may then adjust the initial beam current set point based on the power loss limit (process block 320) and based on the total power consumption limit (process block 322). More specifically, the beam current setpoint may be reduced to reduce the total power consumption. Additionally, the beam current setpoint may be increased to enable the high voltage setpoint to be decreased, thereby decreasing the power loss. Again, the specific amount of adjustments may be based on trade-offs between the various desired objectives (e.g., reliability, useful life, and neutron output) and the constraints (e.g., power loss limit and total power consumption limit).

Based on the above described example, the beam current setpoint 200 may be determined to account for the relationship with other operational parameters, the desired objectives 170, and the constraints 172. It should be appreciated that the corrections to the beam current setpoint 200 may be performed in any order.

Determining Grid Current Setpoint

Figure 33:
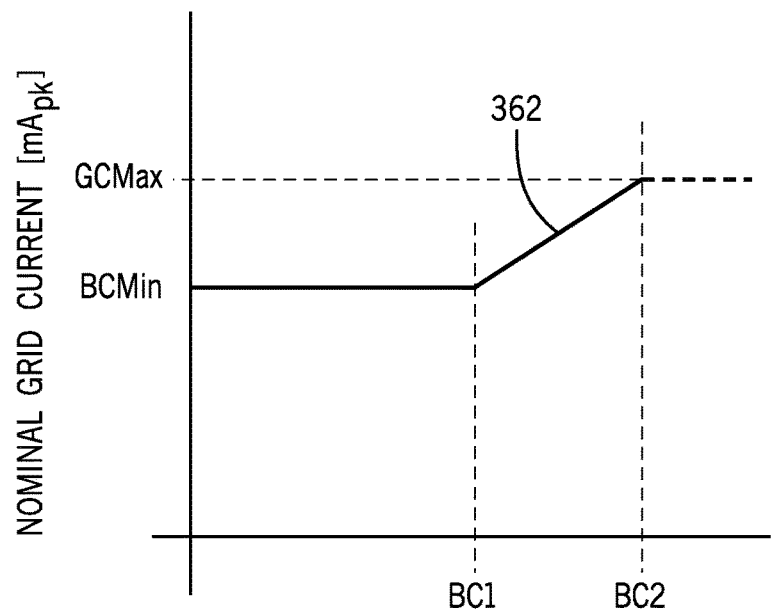
FIG. 33 is a plot of a rule/model describing a relationship between beam current and grid current in the pulse neutron generator of FIG. 3B, in accordance with an embodiment of the present techniques.

To further illustrate, the techniques described herein will be described in relation to the grid current setpoint 202. Generally, the grid current may be increased with the beam current. In some embodiments, this may improve neutron output efficiency (e.g., up to 15%). Thus, one rule and/or model 174 may describe the adjusting the grid current setpoint in relation to the beam current setpoint. An illustrative representation of this rule and/or model 174 is described in FIG. 33 using a grid current beam current curve 362. In the depicted embodiment, the rule and/or model 174 instructs that the grid current setpoint 202 may be maintained at a minimum grid current (e.g., 60 mA) when the beam current is below a first beam current threshold (e.g., between 0-80 uA). Additionally, the rule and/or model 174 instructs that the grid current setpoint 202 is proportionally increased from the minimum grid current to a maximum grid current (e.g., 80 mA) when the beam current is between the first beam current threshold and a second beam current threshold (e.g., between 80 to 120 uA). Furthermore, the rule and/or model 174 instructs that the grid current setpoint 202 be maintained at the maximum grid current when the beam current setpoint is above the second beam current threshold.

Figure 34:
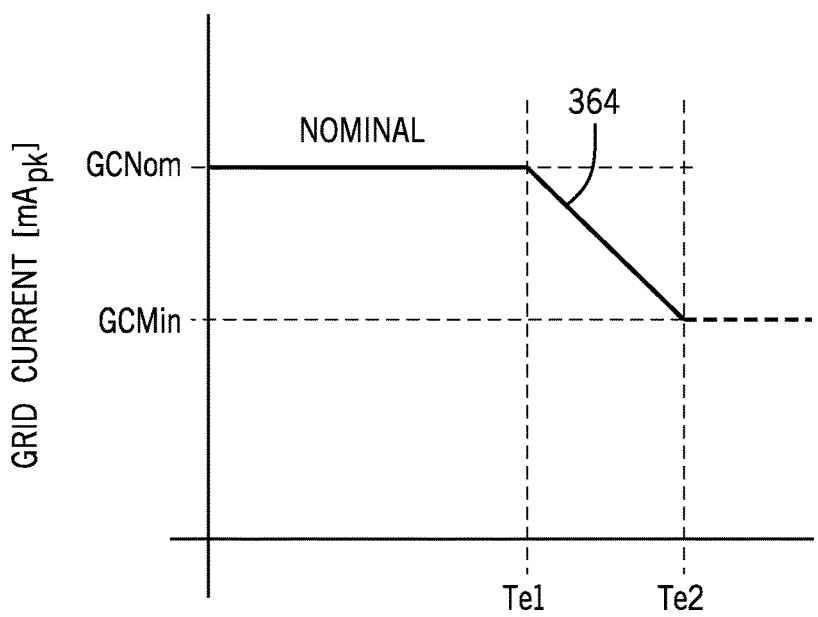
FIG. 34 is a plot of a rule/model describing a relationship between temperature and grid current in the neutron generator of FIG. 3B, in accordance with an embodiment of the present techniques.

Additionally, to improve the reliability of an electrical component (e.g. a connector) in the neutron generator 39B, another rule and/or model 174 may describe adjusting the grid current setpoint 202 based on temperature of the neutron generator 39B. An illustrative representation of this rule and/or model 174 is described in FIG. 34 using a grid current temperature curve 364. In the depicted embodiment, the rule and/or model 174 instructs that the grid current may be maintained at a nominal grid current (e.g., governed by other rules and/or models 174) until reaching a first temperature threshold (155° C.). Once reaching the first temperature threshold, the rule and/or model 174 may instruct that the grid current may be gradually (e.g., linearly) reduced to a minimum grid current (e.g., 45 mA) when the temperature reaches a second temperature threshold (e.g., 175° C.). At higher temperatures, the rule and/or model 174 instructs that the grid current may be maintained at the minimum grid current.

Based at least in part on the determined one or more rules and/or models 174, the control system 162 may determine the grid current setpoint 202. One embodiment of a process 366 for determining the grid current 202 setpoint is described in FIG. 34. Generally, the process 366 includes determining a grid current setpoint based on a beam current setpoint (process block 368), adjusting the grid current setpoint based on temperature (process block 370), and adjusting grid current setpoint based on cathode power (process block 372). In some embodiment, process 366 may be implemented by instructions stored on a tangible, non-transitory, computer-readable medium, such as memory 42, 48, or 64, executed by the processing circuitry 164, such as processor 40, 46, or 62.

Accordingly, the control system 162 may determine the grid current setpoint 202 based on the beam current setpoint 200 (process block 368). More specifically, the control system 162 may determine the beam current setpoint 200 using the techniques described above (e.g., FIG. 30). The control system 162 may then input the beam current setpoint 200 into the rule and/or model 174 (e.g., FIG. 33), thereby determining an initial grid current setpoint. For example, when the beam current setpoint 200 is 80 uA, the control system 162 may determine that the initial grid current setpoint is 60 mA.

Additionally, the control system may adjust the initial grid current setpoint based on temperature (process block 370). In some embodiments, the control system 162 may poll one or more temperature sensors positioned in the neutron generator 39B to determine the temperature. The control system 162 may then input the determined temperature into the rule and/or model 174 (e.g., FIG. 28) to determine a correction to the initial grid current setpoint. To help illustrate, continuing with the above example, when the temperature of the neutron generator 39B is 175° C., the control system 162 may apply a correction of −15 and adjust the grid current setpoint to 45 mA. Furthermore, the control system 162 may adjust the grid current setpoint by subtracting a change in the cathode power, which may be determined via cathode power 180 (process block 372).

Based on the above described example, the grid current setpoint 202 may be determined to account for the relationship with other operational parameters, the desired objectives 170, and the constraints 172. It should be appreciated that the corrections to the grid current setpoint 202 may be performed in any order.

Determining Grid Voltage Setpoint

Figure 35:
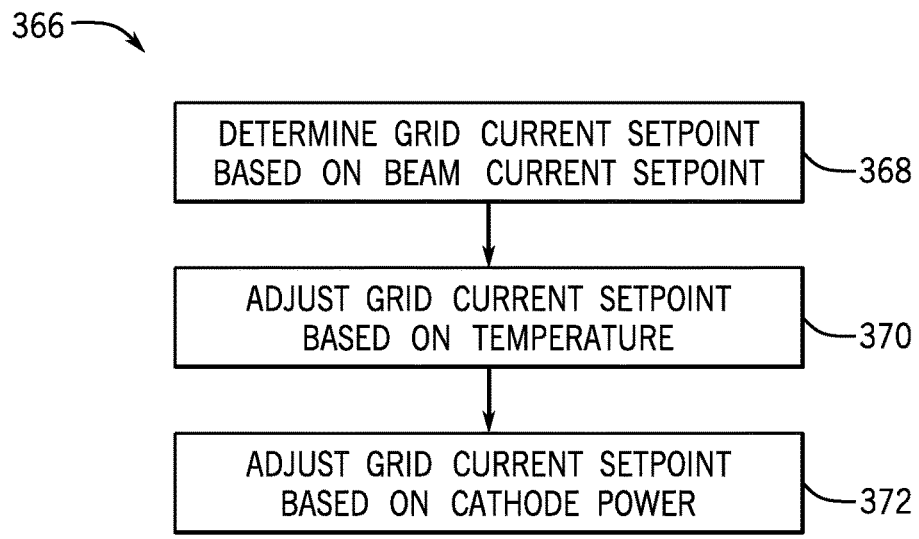
FIG. 35 is a process flow diagram for determining a grid current setpoint, in accordance with an embodiment of the present techniques.
Figure 36:
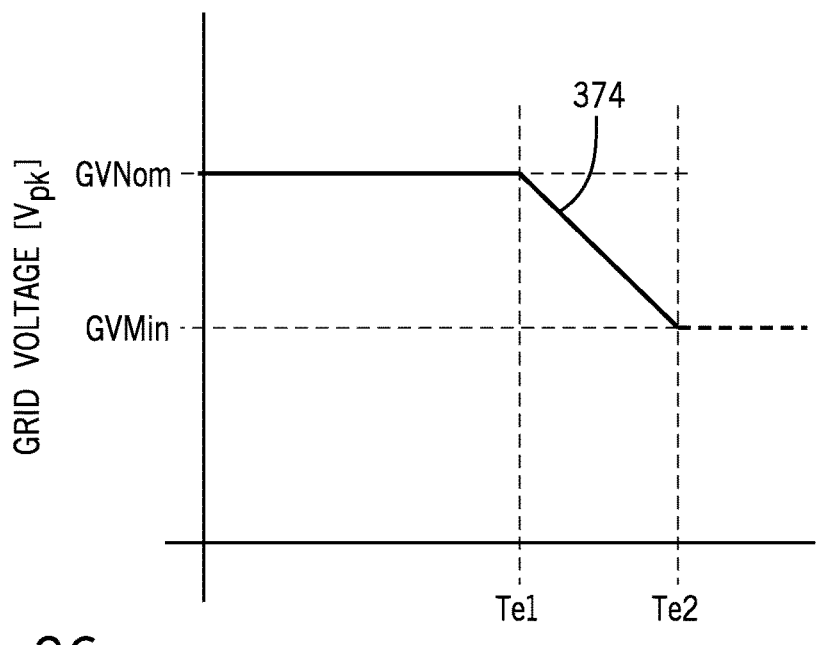
FIG. 36 is a plot of a rule/model describing a relationship between temperature and grid voltage in the neutron generator of FIG. 3B, in accordance with an embodiment of the present techniques.

To further illustrate, the techniques described herein will be described in relation to the grid voltage setpoint 194. To improve the reliability of an electrical component in the neutron generator 39B, one rule and/or model 174 may describe adjusting the grid voltage setpoint 194 based on temperature of the neutron generator 39B. An illustrative representation of this rule and/or model 174 is described in FIG. 35 using a grid voltage temperature curve 374. In the depicted embodiment, the rule and/or model 174 instructs that the grid voltage may be maintained at a maximum grid voltage (e.g., 200 V) when temperature of the neutron generator 39B is below a first temperature threshold (e.g., between 0-155° C.). Once reaching the first temperature threshold, the rule and/or model 174 may instruct that the grid voltage gradually (e.g., linearly) reduced to a minimum grid voltage (e.g., 150 V) when the temperature reaches a second temperature threshold (e.g., 175° C.). At higher temperatures, the rule and/or model 174 instructs that the grid current may be maintained at the minimum grid voltage. 150 V.

Based at least in part on the determined one or more rules and/or models 174, the control system 162 may determine the grid voltage setpoint 194. More specifically, the control system 162 may determine the grid voltage setpoint 194 based on the temperature. In some embodiments, the control system 162 may poll one or more temperature sensors positioned in the neutron generator 39B to determine the temperature. The control system 162 may then input the determined temperature into the rule and/or model 174 (e.g., FIG. 35) to determine a correction to the initial grid current setpoint. For example, when the temperature is 155° C., the control system 162 may determine that the grid voltage setpoint 194 is 200 V.

Based on the above described example, the grid voltage setpoint 194 may be determined to account for the relationship with other operational parameters, the desired objectives 170, and the constraints 172.

Examples

For example, one embodiment may include a method for controlling operation of an electrically operated radiation source may comprise:

selecting initial setpoints for a plurality of controllable parameters;

operating the source and measuring selected non-controllable source operating parameters;

recalculating at least a first one of the controllable parameter setpoints in response to the measured non-controllable operating parameters and values of the controllable parameters based on predetermined relationships between the at least a first controllable parameter and the controllable and non-controllable parameters with respect to operation of the source; and maintaining the at least a first controllable parameter at the recalculated setpoint.

At least a first one of the plurality of controllable parameters may comprise a predetermined minimum value and maximum value.

The predetermined relationships may be at least one of linear and exponential.

The first controllable parameters are chosen from the following parameters: target voltage, beam current, ion source current, ion source voltage, gas reservoir current, cathode current.

The at least a first controllable parameter may comprise grid voltage, the target voltage, the beam current, neutron output, or any combination thereof.

The maintaining may comprise regulating the neutron output.

The recalculating the first controllable parameter setpoint may comprise at least one of Proportional-Integral-Differential (PID) gain control and a step change.

The recalculating may comprise filtering changes in the controllable parameter to avoid unstable control system behavior.

A magnitude of the step changes is limited to avoid unstable control system behavior.

The method further may comprise determining a power loss in a power supply electrically coupled to the electrically operated radiation source and setting an upper threshold on the power loss.

The upper threshold on the power loss is adjusted in relation to operating temperature.

The method further may comprise setting a fixed upper limit on a cathode current.

The method further may comprise increasing the fixed upper limit within a margin to a destruct limit until a failure limit is approached.

The adjusting the first controllable parameter may comprise increasing gas pressure and adjusting the second controllable parameter may comprise decreasing grid current in a pulsed neutron generator.

The adjusting the first controllable parameter may comprise adjusting the target voltage in relation to at least one of a total operating time of the source and a beam current of the source.

The adjusting the target voltage may comprise at least one of linear increase and step increase and wherein an upper limit on target voltage is set.

The adjusting target voltage is based on at least one of modeling target erosion with respect to operating time and characterizing neutron output with respect to operating time for varying beam current.

The beam current is not adjusted for a first predetermined operating time period, and the beam current is increased according to a predetermined function with respect to operating time after an end of the predetermined operating time period.

A leakage current is estimated from a total current load on the target power supply and a determined beam current, or from an amount of beam current noise and wherein the leakage current is used to indicate pulsed neutron source operation that deviates from optimum.

The method further may comprise recalculating a plurality of other of the controllable parameter setpoints in response to the measured non-controllable operating parameters and values of the other controllable parameters based on predetermined relationships between the plurality of other controllable parameters and the non-controllable parameters with respect to operation of the source; and maintaining the plurality of controllable parameters at respective recalculated setpoints.

The source may comprise a dispenser cathode pulsed neutron source.

The source may comprise a Penning cathode pulsed neutron source.

The source may comprise an x-ray generator.

The predetermined relationships of the operating and non-operating parameters with respect to each other are determined empirically.

The source may comprise a neutron generator, and wherein a neutron output thereof is estimated by at least one of characterizing an output of the neutron generator at a set of selected conditions, and measuring the neutron output.

At least one operating parameter is changed for the neutron generator and the neutron output is corrected for the at least one changed parameter.

The at least one parameter may comprise at least one of target voltage, ambient temperature, ion beam current and high voltage power supply leakage current.

The change may comprise at least one of a linear or quadratic change with respect to change in the at least one parameter.

Another embodiment may include a method for well logging comprising:

moving a well logging instrument having an electrically operated radiation source and at least one radiation detector along an interior of a wellbore;

selecting initial setpoints for a plurality of controllable parameters that control beam current and target voltage such that operation of the source is optimized;

operating the source and measuring selected non-controllable source operating parameters;

recalculating at least a first one of the controllable parameter setpoints in response to the measured non-controllable operating parameters and values of the controllable parameters based on predetermined relationships between the at least a first controllable parameter and the controllable and non-controllable parameters with respect to operation of the source;

maintaining the at least a first controllable parameter at the recalculated setpoint; and detecting radiation resulting from interaction of radiation generated by the source with formations surrounding the wellbore and/or fluid in the wellbore.

At least a first one of the plurality of controllable parameters may comprise a predetermined minimum value and maximum value.

The predetermined relationships is at least one of linear and exponential.

The first controllable parameter may comprise target voltage.

The at least a first controllable parameter may comprise gas pressure in a pulsed neutron generator sealed envelope.

The at least a first controllable parameter may comprise grid voltage.

The recalculating the first controllable parameter setpoint may comprise at least one of Proportional-Integral-Differential (PID) gain control and a step change.

The recalculating may comprise filtering changes in the controllable parameter to avoid unstable control system behavior.

A magnitude of the step changes is limited to avoid unstable control system behavior.

The method further may comprise determining a power loss in a power supply electrically coupled to the target and setting an upper threshold on the power loss.

The upper threshold on the power loss is increased relation to source operating temperature.

The increase is delayed by a predetermined time from initiation of source operation.

The method further may comprise setting a fixed upper limit on a cathode emission current.

The method further may comprise increasing the fixed upper limit until a failure limit is approached.

The adjusting the first controllable parameter may comprise increasing gas pressure and adjusting the second controllable parameter may comprise decreasing grid current.

The adjusting the first controllable parameter may comprise adjusting the target voltage in relation to at least one of the total operating time of the source and a beam current of the source.

The adjusting the target voltage may comprise at least one of linear increase and step increase and wherein an upper limit on target voltage is set.

The adjusting target voltage is based on at least one of modeling target erosion with respect to operating time and characterizing neutron output with respect to operating time for varying beam current.

The target voltage is not adjusted for a first predetermined operating time period, and the beam current is increased according to a predetermined function with respect to operating time after an end of the predetermined operating time period.

A leakage current is estimated from a total current load on the target power supply and a determined beam current, and wherein the leakage current is used to indicate source operation that deviates from optimum.

The method further may comprise recalculating a plurality of other of the controllable parameter setpoints in response to the measured non-controllable operating parameters and values of the other controllable parameters based on predetermined relationships between the plurality of other controllable parameters and the non-controllable parameters with respect to operation of the source; and maintaining the plurality of controllable parameters at respective recalculated setpoints.

The predetermined relationships of the operating and non-operating parameters with respect to each other are determined empirically.

The moving the well logging instrument may comprise moving a drill string having the well logging instrument disposed therein.

The moving the well logging instrument may comprise extending and/or retracting an armored electrical cable having the well logging instrument coupled to an end thereof.

The source may comprise a dispenser cathode pulsed neutron source.

The source may comprise a Penning cathode pulsed neutron source.

The source may comprise an x-ray generator.

The source may comprise a neutron generator, and wherein a neutron output thereof is estimated by at least one of characterizing an output of the neutron generator at a set of selected conditions, and measuring the neutron output.

At least one operating parameter is changed for the neutron generator and the neutron output is corrected for the at least one changed parameter.

The at least one parameter may comprise at least one of target voltage, ambient temperature, ion beam current and high voltage power supply leakage current.

The change may comprise at least one of a linear or quadratic change with respect to change in the at least one parameter.

A further embodiment may include a method for detecting a loss of secondary electron emission suppression event in an electrically operated radiation generator, may comprise:
monitoring at least one of cathode current and radiation output of the generator wherein a grid current and an ion beam current are substantially constant; and
identifying the event when at least one of the cathode current, a filament current and a radiation output of the generator changes substantially instantaneously.

The method further may comprise mitigating the event by at least one of recording the event and adjusting a radiation output estimate to account for loss of ion beam current in the generator.

As such, the technical effects of the present disclosure include improving operation of an electrically operated radiation source. More specifically, the operational parameters of the electrically operated radiation source may be determined based on one or more desired objectives, one or more constraints, and one or more rules/models that describe interrelations between the operational parameters. In fact, in some embodiments, the desired objectives may be weighted so that the operational parameters are determined to more closely satisfy those objectives.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A neutron generator comprising:
an ion source configured to generate ions;
a target configured to output neutrons when the ions impact the target;
one or more power supplies configured to supply electrical power to the ion source and the target; and
a control system configured to:
determine one or more rules that describe relationships between operational parameters, useful life, reliability, neutron output, environment, and constraints of the neutron generators;
determine one or more operational parameter setpoints based at least in part on the one or more rules; and
instruct the one or more power supplies to adjust electrical power supplied to the ion source, the target, or both based at least in part on the one or more operational parameter setpoints.

2. The neutron generator of claim 1, wherein the control system is configured to:
determine an initial high voltage setpoint based on a first rule that describes a desired magnitude of high voltage supplied to the target based on on-time of the neutron generator;
determine a first high voltage setpoint correction based on a second rule that describes a limit on the magnitude of the high voltage based on temperature of the neutron generator;
determine a second high voltage setpoint correction based on a third rule that describes a power loss limit of the one or more power supplies based on the temperature;
determine a third high voltage setpoint correction based on a fourth rule that describes a total power consumption limit of the neutron generator based on temperature;
determine a fourth high voltage setpoint correction based on a fifth rule that describes a relationship between the magnitude of the high voltage and magnitude of leakage current;
determine a fifth high voltage setpoint correction based on a sixth rule that describes a relationship between the magnitude of the high voltage and magnitude of beam current; and
determine a corrected high voltage setpoint by applying the first, second, third, fourth, and fifth high voltage setpoint corrections to the initial high voltage setpoint.

3. The neutron generator of claim 2, wherein the control system is configured to:
determine an actual beam current and an expected beam current based on a beam current setpoint;
determine a filament current supplied to a filament in the ion source;
determine that the leakage current is the first actual beam current when:
the actual beam current is greater than the expected beam current by more than a difference threshold; or
the filament current is less than a current threshold;
determine beam current noise based on samples of the actual beam current; and
determine that the leakage current is proportional to the beam current noise when the beam current noise is greater than a noise threshold.

4. The neutron generator of claim 3, wherein the control system is configured to determine that leakage current is minimal when the leakage current is less than a leakage threshold.

5. The neutron generator of claim 1, wherein the control system is configured to:
determine an initial neutron output setpoint based on a first rule that describes a desired neutron output based on temperature of the neutron generator;

determine a first neutron output setpoint correction based on a second rule that describes a power loss limit of the one or more power supplies based on the temperature;

determine a second neutron output setpoint correction based on a third rule that describes a total power consumption limit of the neutron generator based on the temperature; and determine a corrected neutron output setpoint by applying the first and second neutron output setpoint corrections to the initial neutron output setpoint.

6. The neutron generator of claim 1, wherein the control system is configured to:

determine an initial beam current setpoint based on a first rule that describes a magnitude of a beam current based on a desired neutron output;

determine a first beam current setpoint correction based on a second rule that describes a power loss limit of the one or more power supplies based on temperature of the neutron generator;

determine a second beam current setpoint correction based on a third rule that describes a total power consumption limit of the neutron generator based on the temperature; and determine a corrected beam current setpoint by applying the first and second beam current setpoint corrections to the initial beam current setpoint.

7. The neutron generator of claim 1, wherein the control system is configured to:

determine a grid current setpoint based on a first rule that describes a magnitude of a grid current based on a beam current setpoint;

determine a first grid current setpoint correction based on a second rule that describes a limit of the magnitude of the grid current based on temperature of the neutron generator;

determine a second grid current setpoint correction based on power consumption of a cathode in the ion source; and determine a corrected grid current setpoint by applying the first and second grid current setpoint corrections to the initial grid current setpoint.

8. The neutron generator of claim 1, wherein the one or more rules comprises:

a first rule used to determine an initial operational parameter setpoint, wherein the first rule describes a desired value of an operational parameter of the neutron generator based on a first input parameter; and a second rule used to determine an operational parameter setpoint correction, wherein the second rule describes a constraint on the operational parameter based on a second input parameter.

9. The neutron generator of claim 1, wherein the one or more rules comprises a rule that describes a total power consumption limit of the neutron generator based on temperature or that describes a power loss limit of the one or more power supplies.

10. The neutron generator of claim 1, wherein the control system is configured to infer neutron output by the neutron generator based at least in part on target high voltage, beam current, grid current, temperature, and leakage current.

11. The neutron generator of claim 1, wherein the one or more operational parameter setpoints comprise a grid voltage setpoint, a neutron output setpoint, a high voltage setpoint, a beam current setpoint, a grid current setpoint, or any combination thereof.

12. A tangible, non-transitory, computer-readable medium storing instructions configured to be executable by a processor in a control system of a neutron generator, wherein the instructions comprise instructions to:

determine one or more rules that describe relationships between operational parameters, useful life, reliability, neutron output, environment, and constraints of the neutron generators;

determine one or more operational parameter setpoints based at least in part on the one or more rules; and instruct the one or more power supplies to adjust electrical power supplied to the ion source, the target, or both based at least in part on the one or more operational parameter setpoints;

receive, using the processor, input parameters from one or more monitors in an electrically operated radiation source;

determine, using the processor, an initial operational parameter setpoint by inputting a first one or more of the input parameters to a first rule, wherein the first rule describes a desired value of an operational parameter of the electrically operated radiation generated based on the first one or more input parameters;

determine, using the processor, an operational parameter setpoint correction by inputting a second one or more of the input parameters to a second rule, wherein the second rule describes a constraint on the operational parameter based on the second one or more input parameters;

determine, using the processor, a corrected operational parameter setpoint by additively applying the operational parameter correction to the initial operational parameter setpoint; and instruct, using the processor, the electrically operated radiation source to adjust operation based at least in part on the corrected operational parameter setpoint.

13. The computer-readable medium of claim 12, wherein the first and second rules relate the operational parameter to other operational parameters, desired objectives, and constraints.

14. The computer-readable medium of claim 13, wherein the desired objectives include a desired radiation output, a desired useful life of the electrically operated radiation source, and a desired reliability of a power supply and connectors that supply electrical power to the electrically operated radiation source.

15. The computer-readable medium of claim 13, wherein the constraint comprises a power loss limit of a power supply that supplies electrical power to the electrically operated radiation source, a total power consumption limit of the electrically operated radiation source, or a floor and ceiling value of the operational parameter.

16. The computer-readable medium of claim 12, wherein the operational parameter setpoint comprises a grid voltage setpoint, a neutron output setpoint, a high voltage setpoint, a beam current setpoint, or a grid current setpoint.

17. The computer-readable medium of claim 12, wherein the input parameters comprise temperature, cathode power, total power consumption, power loss, high voltage supplied to a target, beam current, grid current, minitron on-time, spectroscopy detector count, or any combination thereof.

18. A method comprising:

determining, using a control system, a first neutron output factor based at least in part on a high voltage supplied to a target in a neutron generator and a first actual beam current of the neutron generator, wherein the first actual beam current comprises number of ions that impact the target per unit time;

determining, using the control system, a second neutron output factor based at least in part on a grid current supplied to an ion source of the neutron generator;

determining, using the control system, a third neutron output factor based at least in part on temperature of the neutron generator;

determining, using the control system, a fourth neutron output factor based at least in part on leakage current in the neutron generator, wherein leakage current comprises electrical power not used to produce and accelerate ions toward the target; and determining, using the control system, a neutron output based at least in part on the first neutron output factor, the second neutron output factor, the third neutron output factor, and the fourth neutron output factor.

19. The method of claim 18, comprising determining the leakage current by:

determining the actual beam current and an expected beam current based on a beam current setpoint;

determining a filament current supplied to a filament in an ion source of the neutron generator;

determining that the leakage current is the first actual beam current when:

the actual beam current is greater than the expected beam current by more than a difference threshold; or the filament current is less than a current threshold;

determining a beam current noise based on samples of the actual beam current; and determining that the leakage current is proportional to the beam current noise when the beam current noise is greater than a noise threshold.

20. The method of claim 18, comprising calibrating a tuning factor used to determine the neutron output based at least in part on a spectroscopy detector count and the determined neutron output.

* * * * *